(12) United States Patent
Weaver

(10) Patent No.: US 6,999,573 B2
(45) Date of Patent: Feb. 14, 2006

(54) LOCALE BASED CALL FORWARDING WITH AUTOMATED CREATION OF NEW LOCALES

(75) Inventor: James Mark Weaver, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/290,418

(22) Filed: Nov. 7, 2002

(65) Prior Publication Data

US 2004/0091095 A1    May 13, 2004

(51) Int. Cl.
*H04M 3/42*    (2006.01)
*H04M 11/00*    (2006.01)
(52) U.S. Cl. .............................. 379/211.02; 455/404.2; 455/417
(58) Field of Classification Search ............ 455/456.1, 455/417, 414.1, 404.2; 379/207.02, 201.12, 379/201.02–201.04, 211.02, 211.01
See application file for complete search history.

(56) References Cited

U.S. PATENT DOCUMENTS

| | | | |
|---|---|---|---|
| 4,658,416 A | 4/1987 | Tanaka | 379/57 |
| 5,197,092 A | 3/1993 | Bamburak | 379/59 |
| 5,329,578 A | 7/1994 | Brennan et al. | 379/67 |
| 5,579,375 A | 11/1996 | Ginter | 379/59 |
| 5,905,789 A * | 5/1999 | Will | 379/211.03 |
| 5,966,653 A | 10/1999 | Joensuu et al. | 455/414 |
| 5,987,113 A | 11/1999 | James | 379/211 |
| 6,038,451 A | 3/2000 | Syed et al. | 455/445 |
| 6,091,810 A | 7/2000 | Shaffer et al. | 379/220 |
| 6,130,938 A * | 10/2000 | Erb | 379/211.02 |

\* cited by examiner

*Primary Examiner*—Benny Q. Tieu
(74) *Attorney, Agent, or Firm*—H. Artoush Ohanian; Mark S. Walker; Biggers & Ohanian, LLP

(57) ABSTRACT

Call forwarding including tracking recent locations of a user with the user's mobile personal communications device and a wireless telecommunications network; determining whether the recent locations match a set of historical location records identifying a locale for the user; creating, if the recent locations do not match a set of historical location records, a new set of historical location records identifying a new locale for the user in dependence upon the recent locations; and forwarding a telephone number in dependence upon the new locale.

30 Claims, 15 Drawing Sheets

LOCALE BASED CALL FORWARDING WITH AUTOMATED CREATION OF NEW LOCALES

BACKGROUND OF THE INVENTION

1. Field of the Invention

The field of the invention is data processing, or, more specifically, methods, systems, and products for locale based call forwarding.

2. Description of Related Art

Conventional call forwarding services offered by telecommunication providers face fundamental usability challenges. Despite the fact that users are often located at the same locales and often forward the same numbers in dependence upon the user being at those locales, call forwarding services require a user to initiate a new call forwarding instruction each time the user forwards a telephone number. Many users are unwilling to take the time to program a call forwarding instruction. Rather than take the time to program a call forwarding instruction, the user misses a telephone call despite being located at a usual locale. It would be beneficial therefore to have methods of locale based call forwarding. It would be beneficial also to have methods of locale based call forwarding including an ability to automatically create new locales in dependence upon reported physical locations of users.

SUMMARY OF THE INVENTION

The present invention provides methods of call forwarding that include tracking recent locations of a user with the user's mobile personal communications device and a wireless telecommunications network; determining whether the recent locations match a set of historical location records identifying a locale for the user; creating, if the recent locations do not match a set of historical location records, a new set of historical location records identifying a new locale for the user in dependence upon the recent locations; and forwarding a telephone number in dependence upon the new locale. In typical embodiments, determining whether the recent locations match a set of historical location records identifying a locale for the user includes comparing a plurality of recent locations and a set a historical location records. Typical embodiments include creating, if the recent locations do not match a set of historical location records, a new set of historical location records identifying a new locale for the user in dependence upon the recent locations further comprises storing the plurality of recent locations as a new set of historical location records. In this type of embodiment, creating a new set of historical location records identifying a new locale for the user in dependence upon the recent locations includes storing the plurality of recent locations as a new set of historical location records, and creating a new locale record; wherein the new set of historical location records are related to the new locale record through a foreign key.

In typical embodiments, creating a new locale record further comprises obtaining a user-specified new locale name from a user for the new locale and storing the user-specified new locale name in a new locale name record, wherein the new locale record is related to the new locale record through a foreign key. In typical embodiments, obtaining a user-specified new locale name from a user for the new locale comprises contacting the user and receiving the user-specified new locale name. In many embodiments, the method of the invention includes creating a new call-forwarding record for a new locale.

In many embodiments, creating a new call-forwarding record for the new locale comprises obtaining a user-specified call forwarding number from a user for the locale and storing the user-specified call forwarding number in a call-forwarding record. Many embodiments include creating a new a phone number record for the new locale and creating a new a phone name record where the new phone name record is related to the new phone number record through a foreign key. In many embodiments, creating, if the recent locations do not match a set of historical location records, a new set of historical location records identifying a new locale for the user in dependence upon the recent locations includes editing the new set of historical records.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
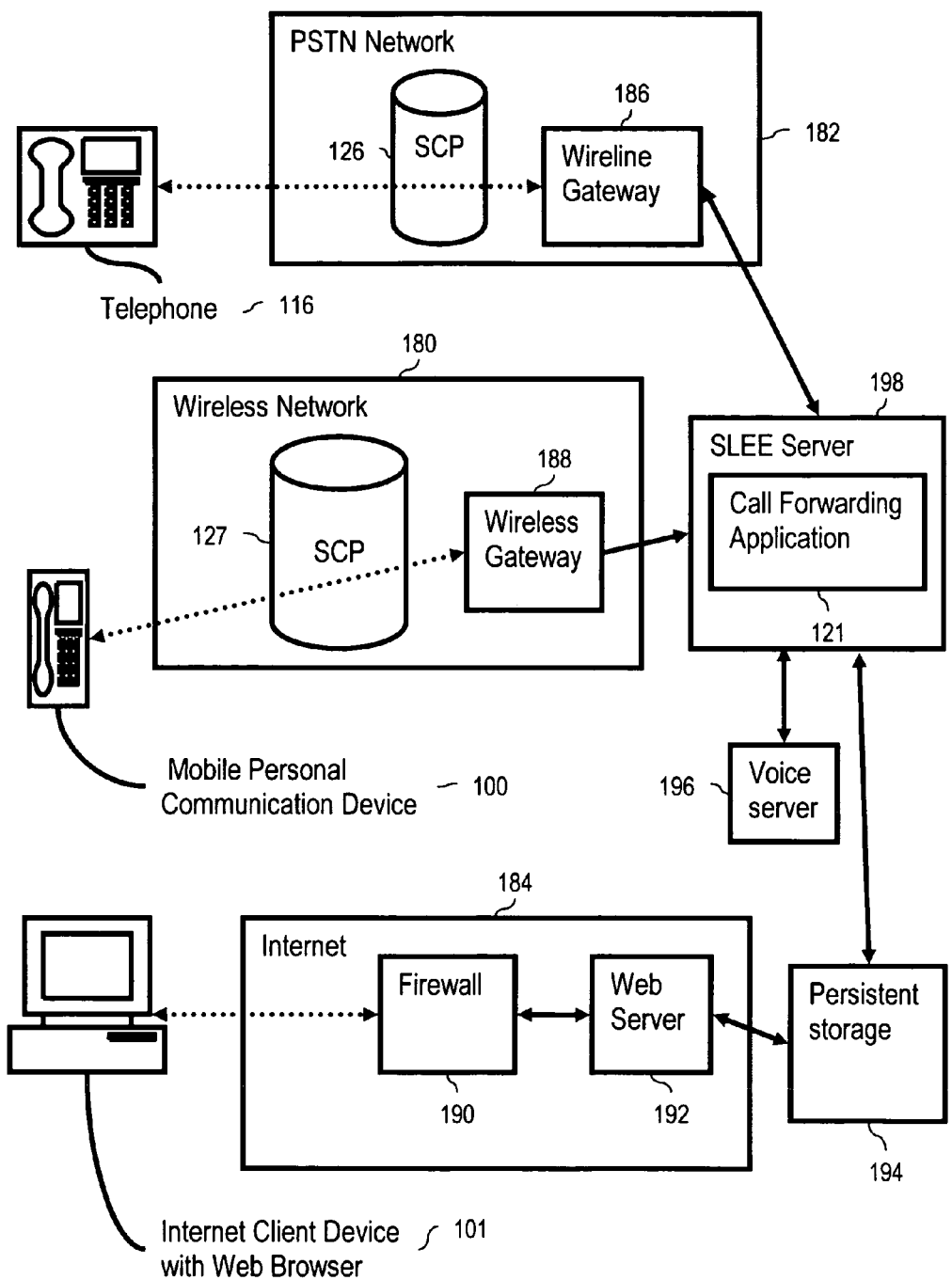
FIG. 1 is a block diagram showing an architecture useful in implementation of the method of the present invention.

The present invention is described to a large extent in this specification in terms of methods for locale based call forwarding. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Browser" means a web browser, a communications application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers."Microbrowsers in wireless web-enabled devices often support markup languages other than HTML, including for example, WML, the Wireless Markup Language.

"DTMF" is an abbreviation for "Dual Tone Multi-Frequency." DTMF is a system used by touch-tone telephones. A specific frequency, or tone, is assigned to each key of the touch-tone telephone. The tone is then identified by a microprocessor.

An "earcon" is an auditory icon, a sound used to represent an event or object.

"ESN" is an abbreviation for "Electronic Serial Number," a serial number programmed into a mobile personal communication device, such as, for example, a mobile telephone, to uniquely identify the device.

The term "field" is used to refer to data elements, that is, to individual elements of digital data. Aggregates of fields are referred to as "records" or "data structures." Aggregates of records are referred to as "tables." Aggregates of tables are referred to as "databases." Records and fields in a table are sometimes referred to respectively as "rows" and "columns." Complex data structures that include member methods as well as member data elements are referred to as "classes." Instances of classes are referred to as "objects" or "class objects."

A "foreign key" is a field in a first table that identifies and references a field in a second table. When such a foreign key is present the two tables are said to be "related."

"In communication" means coupled for data communication through any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"JDBC" refers to Java Database Connectivity, a Java API that enables Java programs to execute SQL statements and therefore interact with any SQL-compliant database. Because most relational database management systems (DBMSs) support SQL and Java itself runs on most platforms, JDBC makes it possible to write a single database application that can run on different platforms and interact with different DBMSs. JDBC is similar to ODBC, but is designed specifically for Java programs, whereas ODBC is language-independent.

"JSP" is an abbreviation for Java Server Page. A JSP is an extension to the Java servelet technology developed by Sun Microsystems. JSPs work in tandem with HTML code to add functionality to HTML. A JSP is translated into Java servlet and processes HTTP requests. The JSP generates responses to the HTTP requests. JSPs are not restricted to any specific platform "Mobile personal communication device" means any device capable of communication through a wireless network. Examples of mobile personal communication devices are wireless phones, personal digital assistants (PDA's), wireless pagers, radios, or any other device capable of wireless telecommunication.

"Parlay" or "Parlay environment" refers to the Open Service Access ("OSA") Application Programming Interface ("API") of the multi-vendor industry consortium known as the "Parlay Group." The OSA API is a technology-independent API that enables applications to access an underlying network's functionality through an open standardized interface. To allow the application to access underlying functionality, Parlay implements specific "service interfaces" and "framework interfaces." Service interfaces access the capabilities of the underlying network. An example of a capability of an underlying PSTN network is call routing. An example of an underlying capability in a wireless network supporting WAP is messaging. The underlying services of the network made available by the service interface are located and managed by the application through a framework interface.

"PSTN" is an abbreviation for "Public Switched Telephone Network." PSTN refers to an international telephone system based on copper wires carrying analog voice data. Telephone service carried by the PSTN is sometimes called "plain old telephone service."

"ODBC" is an abbreviation for "Open DataBase Connectivity." ODBC is a standard database access method developed by Microsoft Corporation. ODBC makes it possible to access data from many applications, regardless of what type of database management systems (DBMS) is handling the data. ODBC inserts a middle layer, called a database driver, between an application and the DBMS. The purpose of the data base driver is to translate the application's data queries into commands that the DBMS understands.

"Server" in this specification refers to a computer or device comprising automated computing machinery on a network that manages resources and requests for access to resources. A "web server," or "HTTP server," in particular is a server that communicates with browsers by means of HTTP in order to manage and make available to networked computers documents in markup languages like HTML, digital objects, and other resources.

A "Service Control Point (SCP)" is an interface to a telecommunication provider's database containing subscriber services information and call routing information.

A "servlet" is a program designed to be executed from within another application, usually a web server's HTTP service. More particularly, servlets, unlike most application programs, are not intended to be executed directly from an operating system. Generally in this disclosure, "servlet" refers to Java servlets running on web servers providing data communications for user interfaces for deferred purchasing systems. As such, servlets are an alternative to CGI programs capable of handling actual reads and writes of data to and from file systems and databases.

"S-HTTP" is an extension of the HTTP protocol that supports sending data securely over the World Wide Web.

A "SLEE server" is a server operating portable telecommunication services and application frameworks in a JAIN SLEE compliant execution environment. "JAIN" refers to the JAVA API for Integrated Networks. SLEE servers in typical embodiments of the present invention are implemented in JAVA using the JTAPI, the Java Telephony API. "JAIN SLEE," or the JAIN Service Logic Execution Environment, an element of Sun Microsystems' industry-oriented de facto standard JAIN initiative, is a set of interfaces and standards for telecommunications and Internet operations within carrier grade telecommunications networks and Internets. JAIN-compliant telecommunications services are tested and deployed in the JAIN Service Logic Execution Environment.

"SMTP" means Simple Message Transfer Protocol. SMTP is the standard protocol for communicating electronic mail messages from electronic mail clients to electronic mail servers and from electronic mail servers to other electronic mail servers.

"Telephony" means functions for translating sound into electrical signals, transmitting them, and then converting them back to sound. The term "telephony" is used to refer to computer hardware and software that performs functions traditionally performed by telephone equipment.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement a hyperlinking protocol, such as HTTP or WAP (the 'Wireless Access Protocol'), in support of URIs and documents in markup languages, regardless whether such servers or groups of servers are coupled to the World Wide Web as such.

"WAP" refers to the Wireless Application Protocol, a specification for use with handheld wireless devices accessing information on HTTP servers, for example. Examples of wireless devices useful with WAP include mobile phones, pagers, two-way radios, hand-held computers, and the like. WAP supports most wireless networks, and WAP is supported by most operating systems. Operating systems specifically engineered for handheld devices include PalmOS, EPOC, Windows CE, FLEXOS, OS/9, and JavaOS. WAP devices that use displays and access the Internet run 'microbrowsers,' browsers using small file sizes that can accommodate the low memory constraints of handheld devices and the low-bandwidth constraints of wireless networks. WAP supports HTML and XML, but "WML," the Wireless Markup Language is specifically devised for small screens and one-hand navigation without a keyboard.

"Websphere®" refers to the "Websphere®" application server available from International Business Machines Corporation. WebSphere is a Java technology-based application server with self-contained, modular applications called "Web Services." The Web Services include applications for security, clustering, connectivity, and scalability.

Architecture and Data Structures

FIG. 1 is a block diagram showing an overall architecture for information handling systems useful in implementing various exemplary embodiments of the present invention. In the architecture of FIG. 1, a telephone (115) on a PSTN network (182), a mobile personal communication device (100) on a wireless network (180), and a web browser (101) on an internet (184) are in communication with a voice server (196), and call-forwarding application (121) running on the SLEE server (198), and persistent storage (194). The call-forwarding application (121) typically is a 'SLEE service,' a root SBB component of a SLEE environment, as described in more detail below.

In the architecture of FIG. 1, the telephone (116) is in communication with the voice server (196), service logic execution environment server (198), and persistent storage (194) through a PSTN Network (182) and a wireline gateway (186). The PSTN network (182) includes a wireline gateway (186) and a PSTN service control point (SCP) (126). The wireline gateway (186) provides an interface between the PSTN's PSTN SCP (126) and the SLEE server. The call-forwarding application (121) running on the SLEE server (198) implements call forwarding methods of the present invention. In dependence upon a user's locale, the call-forwarding application (121) provisions call forwarding instructions onto the PSTN SCP through a wireline gateway. That is, the call-forwarding application (121) provides call forwarding instructions to the PSTN SCP (126) to forward a first telephone number to a second telephone number. The PSTN SCP (126) forwards the first telephone number to the second telephone number and reroutes calls from the first telephone number to the second telephone number through the PSTN network (182).

In the architecture of FIG. 1, the mobile personal communication device (100) is in communication with the voice server (196), service logic execution environment server (198), and persistent storage (194) through a Wireless Network (180) and a wireless gateway (188). The Wireless Network (180) provides wireless communication to the mobile personal communication device (100). The wireless gateway (188) supports wireless communications protocols such as, for example, "WAP," the Wireless Application Protocol, for interaction among the SLEE server, the voice server, and the mobile personal communication device (100) through the wireless network.

In dependence upon the user's locale, the call-forwarding application (121) provisions a call forwarding instruction on an SCP (127) through the wireless gateway (188) in a wireless network (180) to forward a first telephone number of a mobile personal communication device to a second telephone number. The SCP (127) forwards the first telephone number within the wireless network (180). To forward a telephone number for a mobile telephone in the wireless network, the call-forwarding application (121) running on the SLEE server (198) provisions the call forwarding instruction onto the SCP (127) in the wireless network.

The architecture of FIG. 1 includes a voice server (196). The voice server is software and computer hardware designed to synthesize and play voice commands and messages to a user and receive voice responses from the user. The voice server (196) implements a communications interface for voice recognition that receives locale information and call forwarding information from a user. The voice server (196) provides the call forwarding information and locale information, in the form of text or other data, received from the user to the call-forwarding application on the SLEE server to use in locale based call forwarding. An example of a voice server (196) is the WebSphere® Voice Server available from International Business Machines, Inc. The WebSphere® Voice Server includes a voice recognition engine and voice synthesis software to synthesize speech from text for playback over a telephone.

The architecture of FIG. 1 includes a SLEE server (198). The call-forwarding application (121) running on the SLEE server (198) implements call forwarding methods of the present invention. The call-forwarding application (121) tracks recent locations of a mobile personal communication device provided by a location provider, and identifies a user's locales in dependence upon the recent location and historical location records stored in a persistent storage device. The recent locations are provided by the location provider to the call-forwarding application (121) running on the SLEE server through a wireless gateway (188). The arrival of a recent location record in typical embodiments is a defined SLEE event emitted by a location provider acting in effect as a SLEE event producer.

The architecture of FIG. 1 includes a persistent storage device (194). The persistent storage device (194) includes non-volatile memory, such as magnetic drives, optical drives, or any other non-volatile memory that will occur to those skilled in the art. The persistent storage device (194) provides non-volatile storage that maintains the state of objects after an application terminates. The persistent storage (194) device maintains user records, contact rule records, phone number records, phone name records, recent location records, historical location records, call forwarding records, and locale name records. The persistent storage device (194) also provides working cache area for recent locations of a mobile personal communication device provided by a location provider.

The architecture of FIG. 1 includes an internet client device with a web browser (101). The internet client device can be any automated computing machinery capable of networked communications over networks, including, for example, networks implementing tcp/ip (internets) or HTTP (the Web). Examples of internet client devices useful with various embodiments of the present invention include personal computers running browsers (as the example at reference 101 in FIG. 1), Web-enabled personal digital assistants, and Web-enabled wireless telephones. The internet client device (101) of FIG. 1 is in communication with a voice server (196), a SLEE server (198), and persistent storage (194) through an internet (184), and a web server (192). A firewall serves as a secure connection to an internet. In typical embodiments, a user accesses and edits through a web browser many of the data structures needed for operation of various embodiments of the present invention, including, for example, recent location records, historical location records, locale records, phone number records, and phone name records, and call forwarding records stored in the persistent storage device. Database connector software such as ODBC or JDBC connects the persistent storage with the web server and the SLEE server. A web server often supports Java Server Pages and Servlets to further aid in database queries from persistent storage.

Figure 1A:
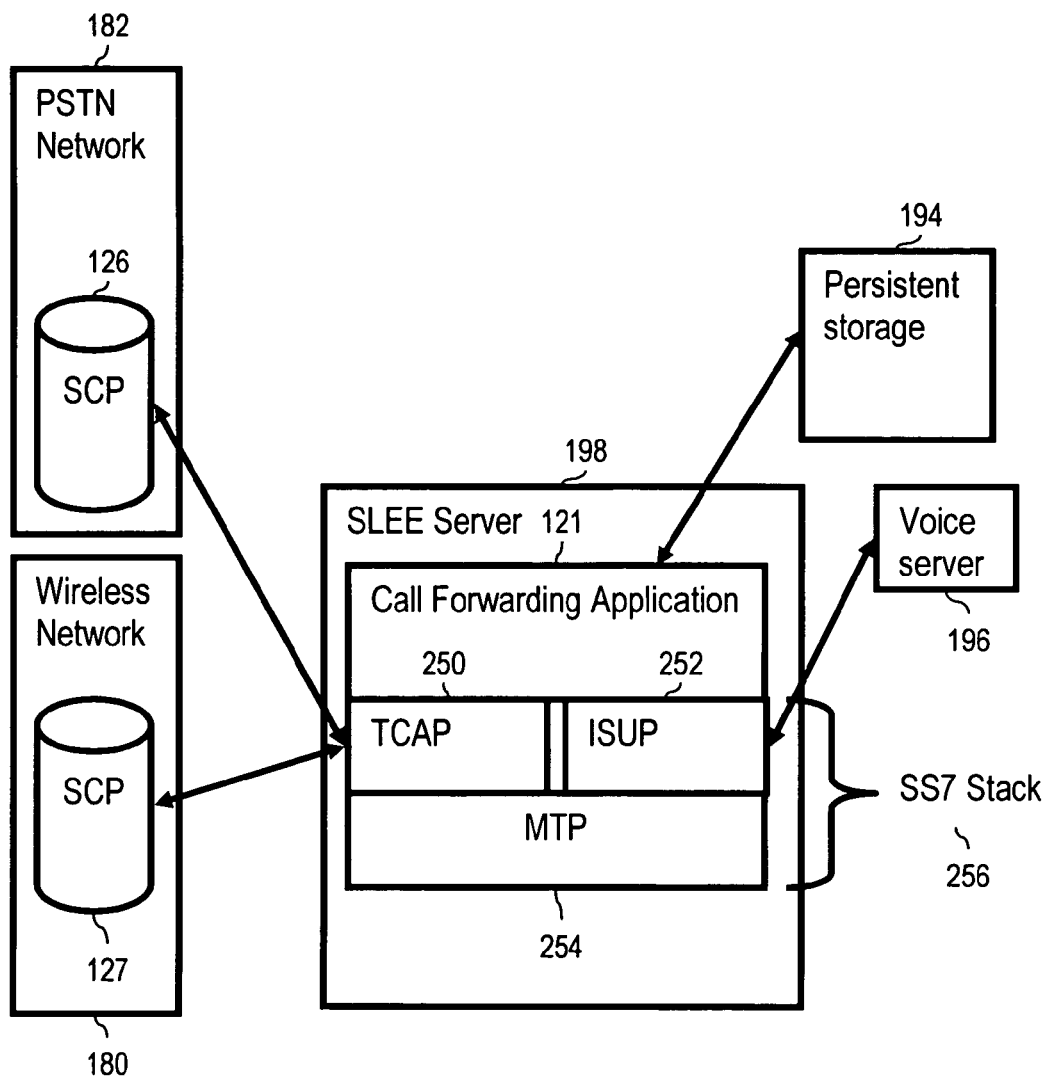

FIG. 1a is a block diagram showing more architectural detail regarding information handling systems useful in implementing various embodiments of the present invention. In the architecture of FIG. 1a, a call forwarding application (121) operates on a SLEE server (198) over an SS7 protocol stack (256). SS7 protocols provide the controlling infrastructure of the telephone system. "SS7" stands for Signaling System 7. SS7 is adopted by all major international standards organizations. SS7 defines a standard for messages, a protocol for out-of-band signaling, and an intelligent network topology needed for advanced telephony services. SS7 defines procedures and protocol by which network elements in a PSTN exchange information over a digital signaling network to effect wireless (cellular) and wireline call setup, routing and control.

The SS7 protocol stack (256) includes a TCAP (250) application layer for data communications with SCPs and remote control functions, including invoking features on remote network switches. "TCAP" stands for Transaction Capability Application Part, an SS7 application protocol layer that supports data communication interoperability by allowing a single SCP to communicate with switches of multiple vendors.

The SS7 protocol stack (256) includes an ISUP (252) application layer for basic telephone connection/disconnect service. "ISUP" stands for ISDN User Part, an SS7 application protocol layer that support interoperability by allowing signaling between the telephone switches of multiple vendors.

The SS7 protocol stack (256) includes an MTP communications layer for message routing and link management. "MTP" stands for Message Transfer Part, an SS7 protocol layer that corresponds approximately to the lower three or four protocol layers from the traditional OSI protocol stack for network data communications. That is, MTP specifies protocol layers for hardware connections, node-to-node link management, message routing, message management, including error detection, error correction, and message sequencing.

A defined above, a "SLEE server" is a server operating portable telecommunication services and application frameworks in a JAIN SLEE compliant execution environment. In effect, a SLEE server is a kind of application server that supports a SLEE, a service logic execution environment. In this discussion, therefore, the terms 'SLEE' and 'SLEE server' are used more or less interchangeably.

SLEE is oriented to event driven applications. SLEE applications are event driven applications, sometimes referred to as asynchronous. SLEE applications receive requests for services in the form of events. One way to build an event driven application is to provide a single event handler method to receive all events. When such an event handler receives an event, it inspects the event and directs further processing of the event with a switch statement, switching on the event type of the event. The switch statement implements the event routing logic within the application.

The SLEE component model is an alternative way of implementing event driven applications that models the external interface of an event driven application as a set of events that the application can receive. Each event type is handled by its own event handler method. This enforces a well-defined event interface. The event driven component model allows the SLEE to provide the event routing logic for the application. In a SLEE, events are defined entities each of which has an event type.

SLEE applications comprise components known as Service Building Block or 'SBB' components. Each SBB component is identified with event types accepted by the component. Each SBB component has event handler methods that contain application code that processes events of these event types.

A SLEE event emitted by an event producer is routed and delivered to a component identified with the event's event type. A SLEE (or a SLEE server) has a logical event router. A SLEE event router receives events emitted from event producers, identifies SBB components interested in the events, and delivers events to the interested SBB components.

An SBB component may be a parent or a child to zero or more other SBB components, forming SBB component entity trees having a root SBB component at the root position of such a tree. A SLEE is the logical parent of the all root SBB components.

A root SBB component is an SBB component that may be instantiated by a SLEE to process events. A root SBB component is identified with event types whose occurrence causes the SLEE (or its logical event router) to instantiate an instance of the root SBB component. Such SBB components are known as root SBB components because their instances may serve as roots of SBB entity trees.

A root SBB component typically represents a complete service. For example, an application developer may develop a CallBlocking SBB component and a CallForwarding SBB component to implement a call blocking service and a call forwarding service. These SBB components are root SBB components because instances of them may be instantiated to block and forward calls respectively. The application developer may create a new root CallBlockingAndForwarding SBB component to implement the call blocking and forwarding service from the CallBlocking SBB and CallForwarding SBB.

The architecture of FIG. 1 includes a call forwarding application (121) running on a SLEE server (198). Persons implementing various embodiments of the present invention will often find it advantageous to implement such embodiments in execution environments such as SLEE. Descriptions of SLEE and SLEE servers in this disclosure, however, are for explanation, not for limitation. Whether to implement any particular embodiments in an execution environment is optional, and to the extent that an execution environment is utilized, there are a number of them that will work with various embodiments of the present invention, in addition to SLEE. Methods of locale based call forwarding according to embodiments of the present invention may be implemented, for example, in a Parlay environment, in a Websphere environment, or in any other execution environment as will occur to those of skill in the art.

Figure 2:
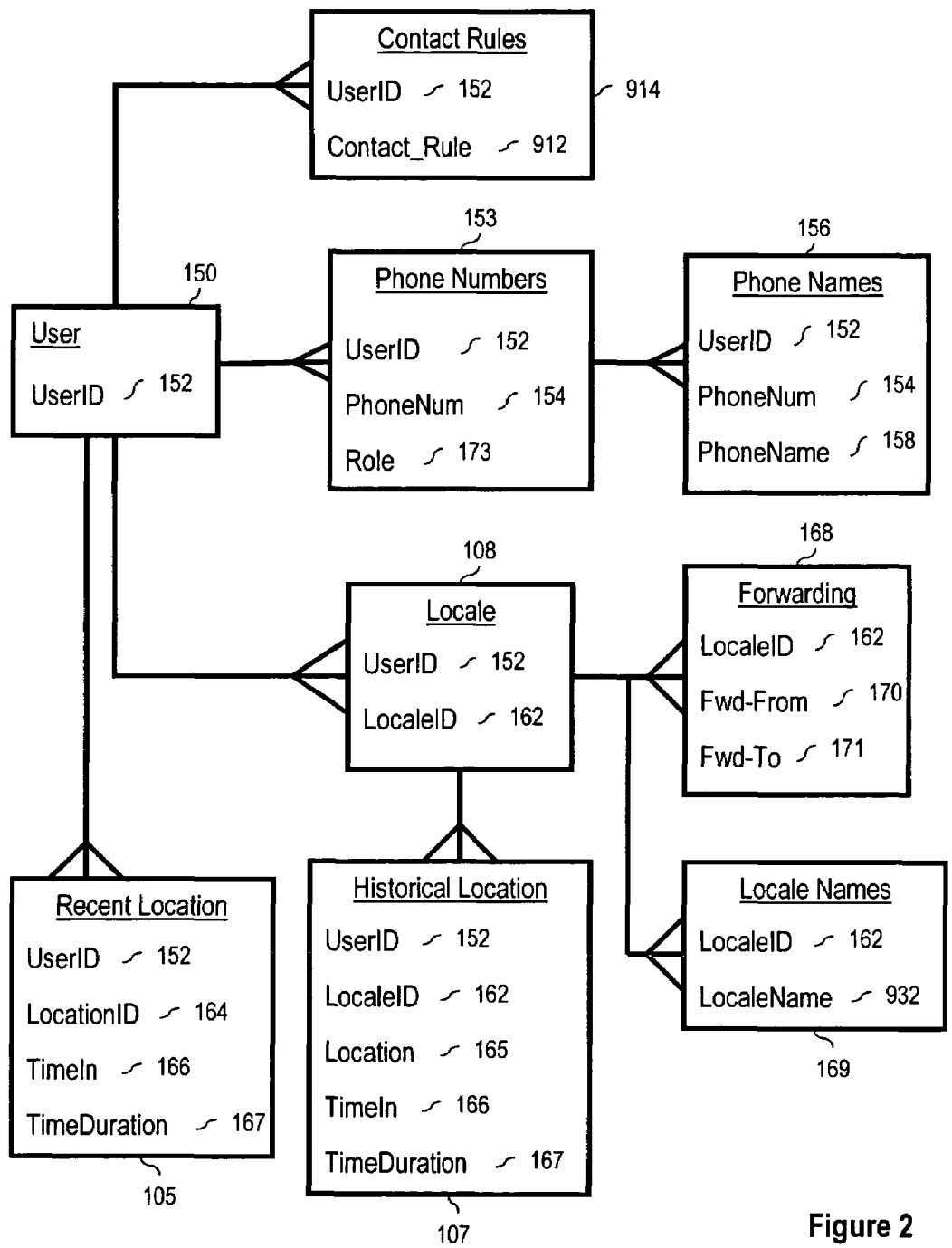
FIG. 2 is a block diagram showing data structures useful in implementing example embodiments of the present invention.

FIG. 2 is a block diagram of exemplary data structures useful in implementing various embodiments of the present invention. The data structures of FIG. 2 include user records (150), each of which represents a user or subscriber for call forwarding according to embodiments of the present invention. A user typically has authority to forward telephone numbers on PSTN networks, wireless networks, and internets to other telephones numbers on PSTN networks, wireless networks, and internets. The user records (150) include a field for an identification code (152) for each user. An ESN of a user's mobile personal communication device may be used as a userID (152). Alternatively, some other name or number is stored in the userID field (152).

The data structures of FIG. 2 include recent location records (105). Each recent location record represents a recent physical location of a user, inferred or reported from a location provider as a recent location of a device in the possession of the user. Recent location records (105) are related to user records (150) many-to-one through the userID field (152) used as a foreign key. Each user shall have reported and recorded for the user many recent location records. Each recent location record (105) includes a locationID (164) which is the location of a mobile personal communication device provided by a location provider. The location information stored in the locationID (164) field includes data such as, for example, mobile communication tower numbers, geophysical coordinates, latitude, longitude, global positioning coordinates, and any other location data provided by any location provider, as will occur to those skilled in the art. An example of a location provider is AT&T Wireless. The "Find Friends" service provided by AT&T Wireless provides to third parties the location of a registered wireless phone to the nearest cell phone tower.

A location provider may be a wireless telecommunication provider providing wireless communication service to the mobile personal communication device. The accuracy of the location in the locationID field (164) is dependent upon the precision with which the location provider identifies the physical location of the mobile personal communication device. Wireless communications providers identify the location of a mobile personal communication device by identifying one or more of the many communication towers in communication with the mobile personal communication device. The signal strength of the mobile personal communication device and the known location of the communication towers in communication with the mobile personal communication device provides an approximate location of the mobile personal communication device. A location provider (111) identifies a precise location of the mobile personal communication device by identifying at least three communication towers in communication with the mobile personal communication device and using triangulation between the at least three communication towers to identify the location of the mobile personal communication device.

The recent location records (105) of FIG. 2 include a time-in field (166) representing a time stamp indicating the time the mobile personal communication device entered a physical location. The time stamp is provided by the location provider. The recent location records (105) of FIG. 2 also includes a time duration field (167) representing the length of time the mobile personal communication is located in the physical location. The time duration is calculated by subtracting the time-in fields (166) of two sequential recent location records (105). The time-in field (166) of the earlier recent location record is subtracted from the time-in field (166) of the later recent location record. The result of the subtraction is stored in the time duration field (167) of the earlier recent location record (105).

The data structures of FIG. 2 include locale records (108). Each locale record represents a physical condition of a user for which a call forwarding system according to embodiments of the present invention will provide a particular arrangement of call forwarding. 'Physical condition of a user' means any physical configuration of a person that can be detected and identified. It does not mean merely a physical location. On the contrary, it often means that a user is in motion across several or many physical locations. Each physical condition of a user that can be tracked for call forwarding and that is sufficiently meaningful to the user to be identified as such is represented in data structures by a locale record and referred to in this disclosure as a 'locale.' Each locale carries with it one or more call forwarding instructions for telephone numbers that the user is authorized to forward. The locale records (108) are related many-to-one to the user records (150) through the userID field (152) used as a foreign key. Each locale record (108) includes a localeID (162) uniquely identifying a particular locale. A locale is defined in terms of the data structures of FIG. 2 by a set of historical location records. For example, "home," "going to work," "work" are examples of locales.

The data structures of FIG. 2 include historical location records (107). Each historical location record is part of a set of two or more historical location records, each of which represents a previous physical location of a user that has been predefined by the user to identify a locale. Historical location records (107) are related many-to-one to the locale records (108) through the userID (152) and the localeID (162) as a composite foreign key. The historical location records (107) include a location field (165). Coordinates, mobile communication tower numbers, or any other location identifier provided by a location provider as will occur to those skilled in the art is stored in the location field (165). Each historical location record (107) includes a time-in field (166) representing a time stamp indicating the time the user entered a physical location. The historical location records (107) also includes a time duration field (167) representing the length of time the user was located in the physical location. A high value in the time duration field (167) indicates a locale where a user remains relatively stationary, such as, for example, a work place. A low time value indicates motion on the part of a user, such as, for example, traveling to work.

The data structures of FIG. 2 include forwarding instruction records (168) for user's locales. The forwarding instruction records (168) are related to the locale records (108) many-to-one through the localeID field (162) used as a foreign key. Each forwarding instruction record represents an instruction from the user to forward a particular telephone number when a user's physical condition is associated with a particular locale. Each forwarding instruction record (168) includes a forward-from field (170) identifying the telephone to be forwarded according to a forwarding instruction record. A telephone number that the user has authority to forward is identified in the forward-from field (170). The telephone number stored in the forward-from field (170) is a telephone number that the user specified to be forwarded in dependence upon the user's locale. Alternatively, the forward from-field (170) includes a phone name corresponding to a telephone number that the user specified to be forwarded in dependence upon the user's locale. The forwarding instruction record (168) also includes a forwarding-to field (171), representing a telephone number to which calls are to be forwarded. Alternatively, a phone name corresponding to a telephone number is stored in the forward-to field (171).

The data structures of FIG. 2 include locale name records (169). The locale name records (169) are related to the locale records (108) many-to-one through the localeID field (162) used as a foreign key. The locale name records (169) represent user specified names for a given locale. A user specified name allows a user to easily identify locales. The locale name records (169 include a locale name field (932). A user specified name for the related locale of the mobile personal communication device is stored in the locale name field (932). Many names may be given to a single locale. For example, the words "work," "office," and "IBM" are locale names each stored in a separate locale name record (169) corresponding to the work locale of an employee of IBM.

The data structures of FIG. 2 include phone number records (153). The phone number records (153) represent phone numbers with which a user has some relationship, including, for example, telephone numbers the user is authorized to forward and telephone numbers to which the user forwards calls. The phone number records (153) are related to the user records (150) many-to-one through the userID field (152) used as a foreign key. The phone number records (153) include a phone number field (154). A user specified phone number is stored in the phone number field (154).

The phone number records (153) include a role field (173). A role is a description of the user's relationship with a telephone number. The role of the telephone number stored in the telephone number field (154) is stored in the role field (173). One example of a role is referred to as a "trigger." In typical embodiments of the present invention, a "trigger" is the role of the telephone number of a mobile personal communication device from which recent locations for a user are derived. Only one phone number may be identified as having the role of "trigger."

Another example of a role is "owned," for a telephone number that the user is authorized to forward. "Destination" is a role indicating that the telephone number stored in the telephone number field (154) is a telephone number the user does not have authority to forward, but is a telephone number to which the user forwards calls.

In some embodiments, roles are hierarchical. For example, the role of trigger can indicate that the number is both owned and a destination. In such an embodiment, the user is authorized to forward from and forward to the number of the mobile personal communication device. An 'owned' role can indicate the number is both an owned number and a destination. In such an embodiment, the user is authorized to forward from and forward to an owned number.

The data structures of FIG. 2 include phone name records (156). The phone name records (156) represent user specified names a user has given to a particular phone number stored in a related phone number record (153). By assigning a particular phone number a user-specified name, the user may identify the phone number by name in establishing a call forwarding instruction for a locale. By naming phone numbers, the user avoids having to look up or memorize telephone numbers that the user commonly forwards telephone numbers to or from when establishing a call forwarding instruction for a locale. The phone name records (156) are related to the phone number records (153) many-to-one through the userID field (152) and the phone number field (154). The userID field (152) and the phone number field (153) are used as a composite foreign key. The phone name records (156) include a phone name field (158). A user specified phone name is stored in the phone name field (158). The phone name is a user specified name corresponding to a particular phone number (154) stored in the phone number record (153). For example, many user specified phone names may correspond to a single phone number stored in the phone number record. "Work," "Office," "IBM" may be names that correspond to the office telephone number of a single employee of IBM who offices at an IBM facility.

The data structures of FIG. 2 include contact rule records (914). The contact rule records (914) represent rules establishing when a user may be contacted. The contact rule records indicate times or conditions when a user may be contacted or times and conditions when a user may not be contacted. For example, a contact rule may be a block-out time. A user may specify that the user is not to be contacted between 11:00 pm and 6:30 am, because the user is sleeping. Or the user is not to be contacted on Sunday, between 8:00 am and 1:00 pm, because the user is typically at church. The contact rule may be that the user is not to be contacted en route. That is, if the recent locations provided by the location provider indicate that the user is moving from recent location to recent location, the user is not to be contacted for safety, because the user may be driving a car. The contact rule records (914) are related to the user record (150) many-to-one through the userID (152) field used as a foreign key. The contact rule records (914) include at least one contact rule (912) field. A user-specified contact rule, such as an indication not to contact the user while en route, is stored in the contact rules field (912). The contact rule record of FIG. 2 is illustrated as a generalized record. The contact rule (914) records vary to accommodate various user specified contact rules.

Locale-Based Call Forwarding

Figure 3:
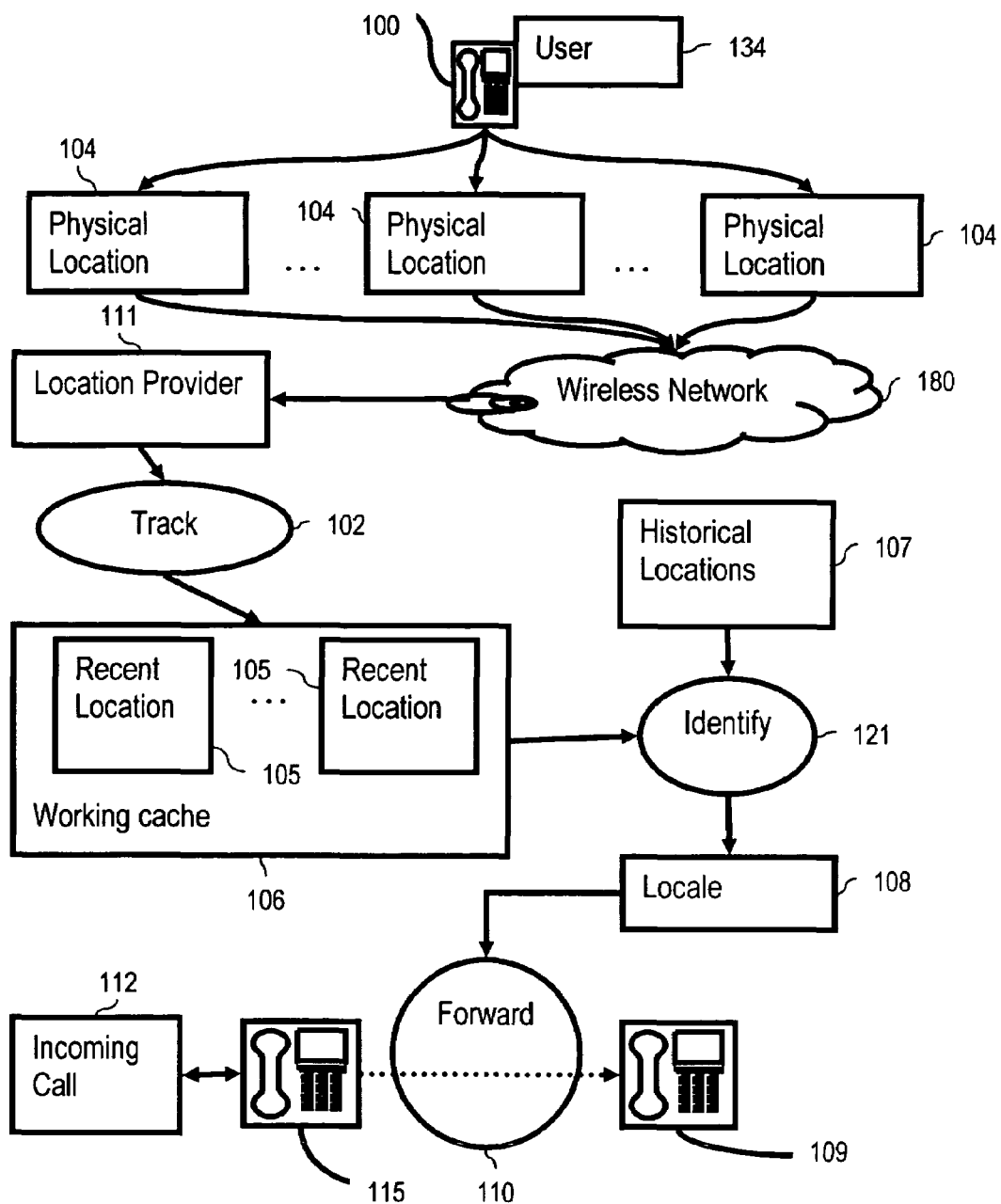
FIG. 3 is a data flow diagram showing a method of forwarding a telephone number.

FIG. 3 sets forth a data flow diagram illustrating an exemplary method of call forwarding according to an embodiment of the present invention. The method of FIG. 3 includes tracking (102) recent locations (105) of a user (134) with the user's mobile personal communications device (100) and a wireless telecommunications network (180). Tracking recent locations includes gathering recent location records into a working cache as the recent location records arrive from location providers. A location provider (111) follows the physical locations (104) of the mobile personal communication device (100) and provides data in the form of recent location records corresponding to the physical locations (104) of the mobile personal communication device. Because the mobile personal communication device (100) is typically with the user, the locations provided by the location provider (111) corresponding to the physical locations of the mobile personal communication device (100) are tracked (102) as the recent locations (105) of the user (134).

The mobile personal communication device (100) has a unique ESN. Wireless communications providers identify the location of a mobile personal communication device (100) by identifying one or more of the many communication towers in communication with the mobile personal communication device (100). The signal strength of the mobile personal communication device and the known location of the communication towers in communication with the mobile personal communication device provide an approximate location of the mobile personal communication device (100). A location provider (111) may identify a precise location of the mobile personal communication device by identifying at least three communication towers in communication with the mobile personal communication device and using triangulation between the at least three communication towers to identify the location of the mobile personal communication device.

Tracking (102) includes receiving recent location records (105) through a wireless gateway, storing the recent location records (105) in working cache memory, and tracking the recent locations (105) stored in working cache memory. Tracking (102) may be carried out by call-forwarding application operating as a root SBB component on a SLEE server, and the working cache memory is implemented in computer random access memory, on a persistent storage device, or through other computer memory as will occur to those of skill in the art.

The method of FIG. 3 includes identifying (121) a locale (108) for the user (134) in dependence upon the recent locations (105) and upon historical location records (107) for the user (134). Identifying (121) a locale (108) for the user includes comparing recent location records (105) in working cache memory (106) with historical location records (107). Identifying (121) a locale includes identifying historical location records (107) having approximately the same location in their location fields as are contained in location identification fields (reference 164 on FIG. 2) in the recent location records (105) and approximately the same time duration (reference 167 on FIG. 2) as the time durations (167 on FIG. 2) in the recent location records. If a set of historical location records having approximately the same location as the recent locations and approximately the same time duration exists, identifying (121) comprises identifying the locale record related to the historical location records (107) matching the recent location records (105). Identifying (121) a locale (108) for the user (134) may be carried out by call-forwarding application running on a SLEE server.

The method of FIG. 3 includes forwarding (110) a telephone number (115) in dependence upon the locale (108). Forwarding (110) includes routing calls for a first telephone number (115) to a second telephone number (109) such that when a caller places a telephone call (112) to the first telephone number (115), the call is connected to the second telephone number (109). The first telephone number (115) and the second telephone number (109) of FIG. 3 are PSTN wireline telephone numbers, wireless network telephone phone numbers, telephone numbers associated with telephony applications running over TCP/IP, or any other telephone numbers that will occur to those of skill in the art. As between the first telephone number and the second telephone number, there is no limitation regarding type of telephone number. The first telephone number can be a PSTN number while the second telephone number is wireless. The first telephone number can be a wireless telephone number and the second telephone number can be a telephone number for a computer implementing telephony over TCP/IP. Any combination of types among the first telephone number and the second telephone number is well within the scope of the present invention.

Forwarding a telephone number includes provisioning a call forwarding instruction on a PSTN SCP through a wireline gateway, for example, or provisioning a call forwarding instruction on an SCP through a wireless gateway. Provisioning call forwarding instructions onto an SCP through the appropriate gateway is typically carried out by a call-forwarding application of the present invention operating as a root SBB component on a SLEE server.

Figure 4:
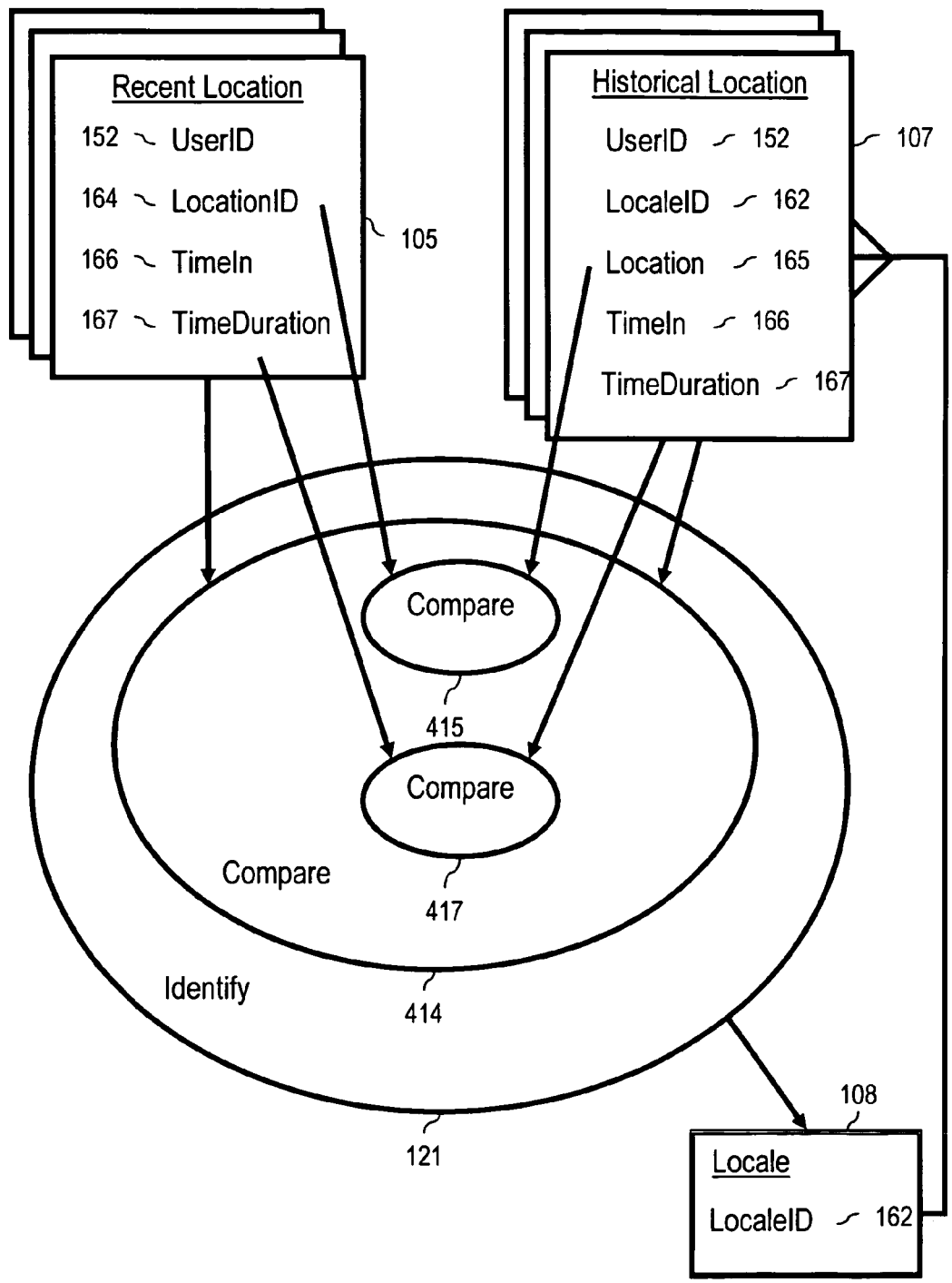
FIG. 4 is a data flow diagram showing a method of identifying a locale.

FIG. 4 is a data flow diagram illustrating a method of identifying (121) a locale (108) in dependence upon recent locations (105) and historical location records (107). In the method of FIG. 4, identifying (121) a locale (108) includes comparing (414) historical location records (107) and recent location records (105) to find a set of historical location records matching the set of recent location records currently in a working cache. The historical location records (107) are related to the locale (108) through a locale identification field (162) used as a foreign key, so that, when a set of historical location records is found to match the recent location records currently in cache, the locale id can be read directly from any of the historical location records in the matching set.

Comparing (414) historical location records (107) and recent location records (105) includes comparing (415) the location fields (164) in the recent location records (105) and location fields (165) in the historical location records (107). Comparing (414) historical location records (107) and recent location records (105) in the method of FIG. 4 includes comparing (417) time duration fields (167) in the location records (105) and time duration fields (167) in the historical location records (107).

Comparing (414) the recent locations (105) and the historical location records (107) does not require identical locations in the location field of the recent locations (105) and in the location field of the historical location records (107) to identify (121) a locale (108). For example, a drive to work in traffic may cause a user to depart only slightly from the user's usual path to work. However, the locale of "driving" to work is still identified if a sufficient number of historical location records (107) are identified as matching recent location records (105). Even further, a drive to work may occur on a light traffic day causing the time duration fields (167) of the recent locations (105) to be shorter that the time duration fields (167) of the historical location records (107). In embodiments that include duration comparisons for locale matching, the time duration fields do not have to have the exact value to be considered a match to identify (121) a locale (108).

Even the same drive to work can vary in time duration at each location along the way slightly on any given day. Therefore, the degree to which any field in the recent location record (105) and the historical location record (107) must match to identify a locale varies in dependence upon, for example, the precision of the location information in the recent location records and the historical location records, the tolerances of the methods used for comparing (414) the recent location records (105) and the historical location records (107), user specified conditions, and other factors that will occur to those skilled in the art. It is the call forwarding call-forwarding application (reference 121 on FIG. 1) implementing the processing steps according to embodiments of the present invention, typically executing in a SLEE environment on a SLEE server that typically carries out comparisons of recent locations (105) and historical location records (107). Recent location records (105) and historical location records (107) are stored in a persistent storage device (reference 194 on FIG. 1).

Figure 5:
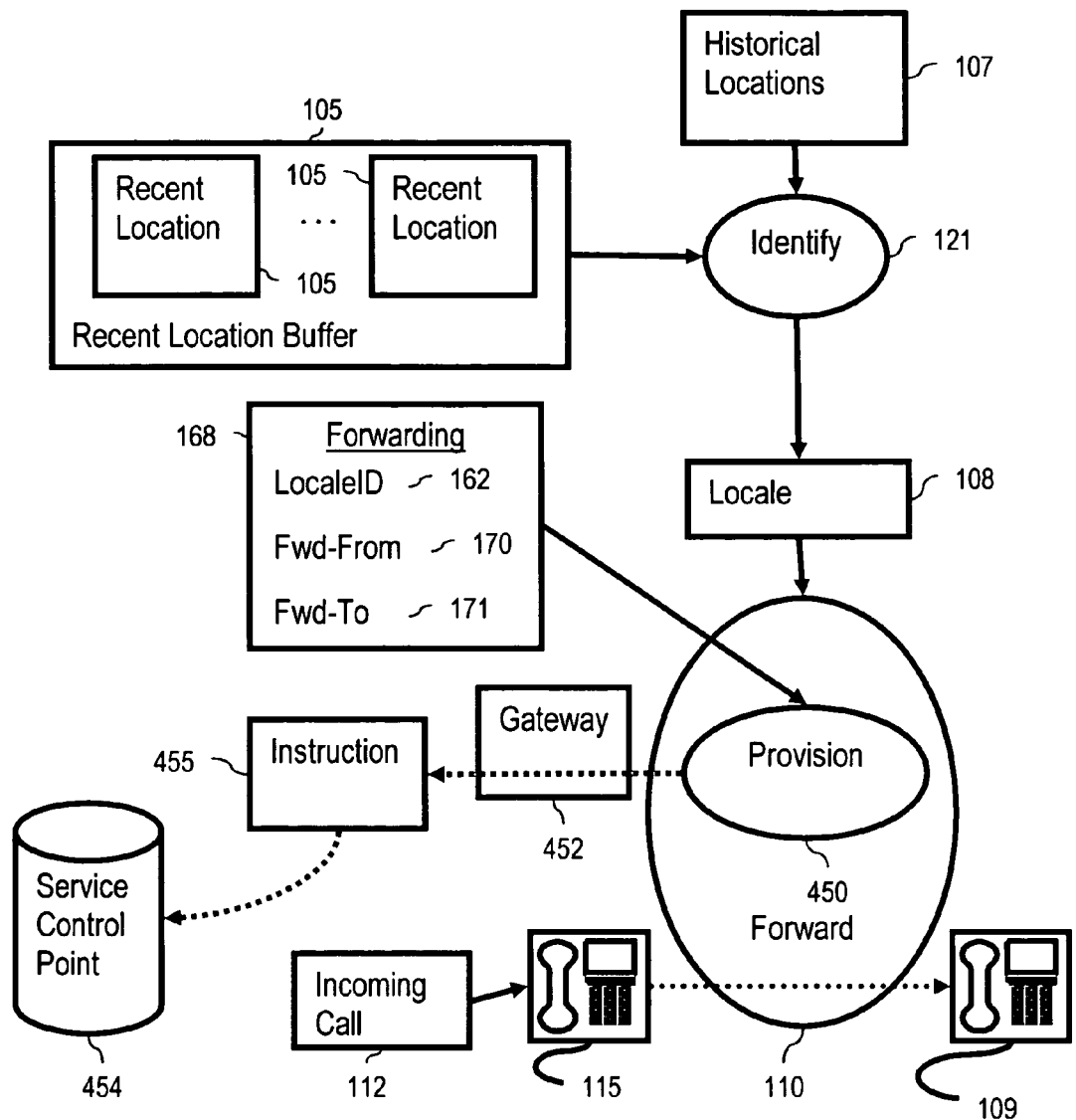
FIG. 5 is a data flow diagram showing a method of forwarding a telephone number.

FIG. 5 is a data flow diagram illustrating a method of forwarding a telephone number. In the method of FIG. 5, forwarding (110) a telephone number (115) includes provisioning (450) call forwarding instructions (455) to a service control point (454) through an appropriate gateway (452). Provisioning (450) the call forwarding instructions typically includes reading call forwarding instructions from a call forwarding instruction record (168) stored in persistent storage. The call forwarding instruction record (168) provides a LocaleID field 162 for relating the call forwarding instruction to a locale. The call forwarding instruction records from which call forwarding instructions are inferred are the call forwarding records related to a locale record identified by a match between historical location records and the recent location record currently in working memory cache.

Each call forwarding instruction record (168) provides a Fwd-From field (170) in which is stored a phone number to be forwarded. The call forwarding instruction record (168) provides a Fwd-To field (171) in which is stored a phone number to which calls are to be forwarded.

In the method of FIG. 5, provisioning (450) call forwarding instructions (455) includes reading from a call forwarding instruction record (168) a first telephone number to be forwarded (170) and reading from the call forwarding instruction record a second telephone number to which calls are to be forwarded (171). Provisioning (450) call forwarding instructions also includes providing the first telephone number to be forwarded to an SCP (454) through a gateway (452) and providing the second telephone number to which calls are to be forwarded to the SCP (454) through a gateway (452).

In some call forwarding systems according to FIG. 5, call-forwarding application running on a SLEE server reads a call forwarding instruction record (168) related to a locale record (108) from persistent storage and provisions (450) a forwarding instruction (455) onto the SCP (454) through a gateway (452).

Figure 6:
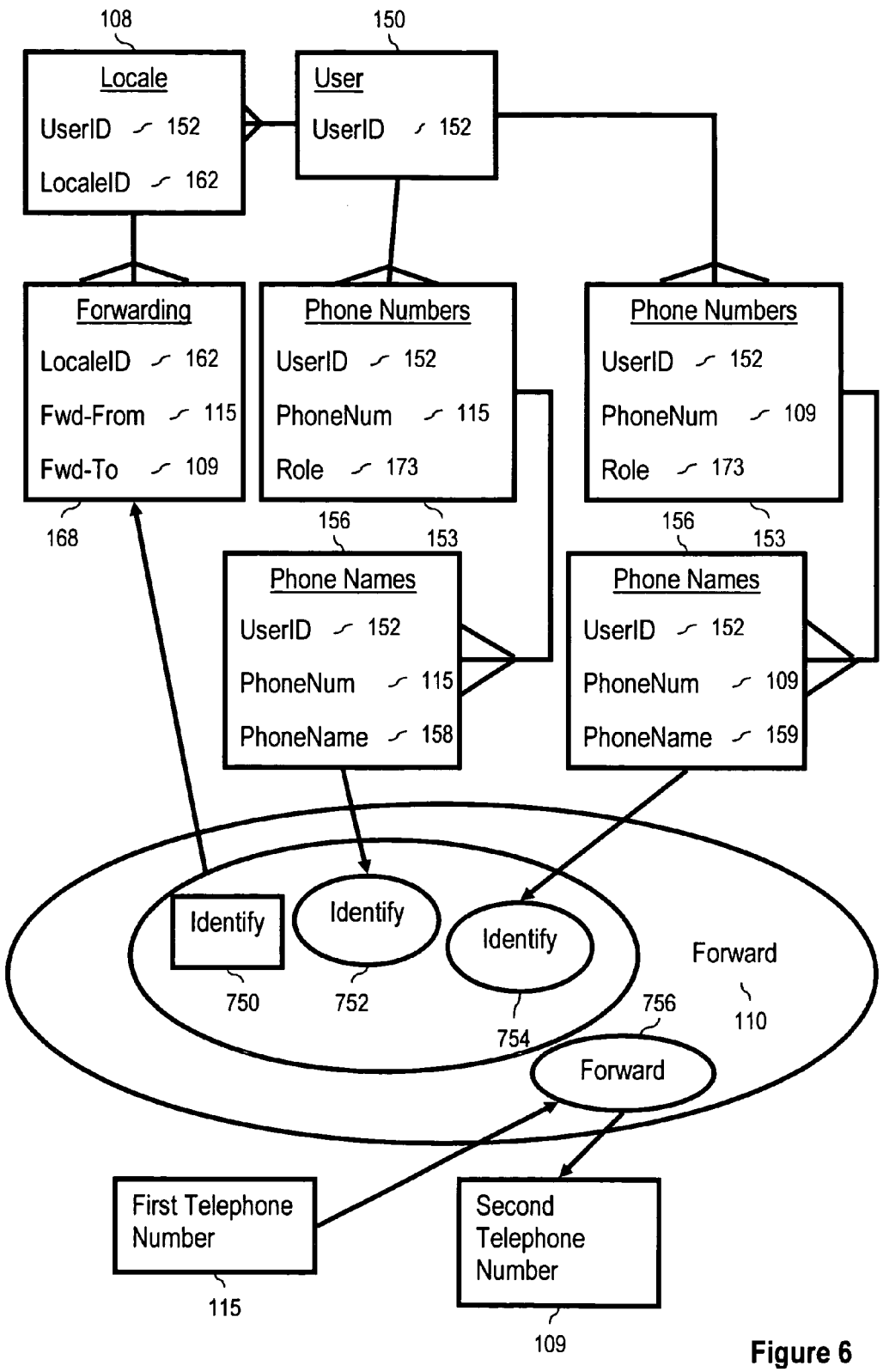
FIG. 6 is a data flow diagram showing a method of forwarding a telephone number.

FIG. 6 is a data flow diagram illustrating a method of forwarding (110) a telephone number. The method of FIG. 6 includes identifying (750) a forwarding instruction record (168) for a locale record (108). The forwarding instruction record (168) is related to the locale record (108) through a localeID field (162) which is used as a foreign key. In the method of FIG. 6, identifying (750) a forwarding instruction record (168) includes identifying (752) by a first telephone name (158) a first telephone number (115) that the user is authorized to forward. Identifying (752) a forwarding instruction record includes reading a phone name from a phone name record (156) and identifying a phone number record that is related to the phone name record and reading the first telephone number (115) from the phone number record. Call-forwarding application running on a SLEE server identifies a first telephone number by a first telephone name by reading a phone name from a phone name record stored in persistent storage and reading a phone number from a phone number record that is related to the phone name record.

In the method of FIG. 6, identifying (750) a forwarding instruction record (168) also includes identifying (754) by a second telephone name (159) a second telephone number (109) specified by the user. Identifying (754) a second telephone number includes reading a phone name from a phone name record (156) and identify a phone number record that is related the phone number record through a foreign key and reading the second telephone number from the phone number record. The call-forwarding application running on a SLEE server identifies a second telephone number by a second telephone name by reading a second telephone name from the phone name record and reading a second telephone number from a telephone number record that is related to the phone name record.

The method of FIG. 6, includes forwarding (756) the first telephone number (115) to the second telephone number (109). Forwarding (756) includes provisioning the first telephone number (115) onto an SCP through a gateway. Forwarding (756) includes provisioning the second telephone number (115) onto an SCP through a gateway. Call-forwarding application running on a SLEE server the provisions a PSTN SCP through the wireline gateway or provisions an SCP through a wireless gateway to forward the first telephone number (115) to the second telephone number (109).

Figure 7:
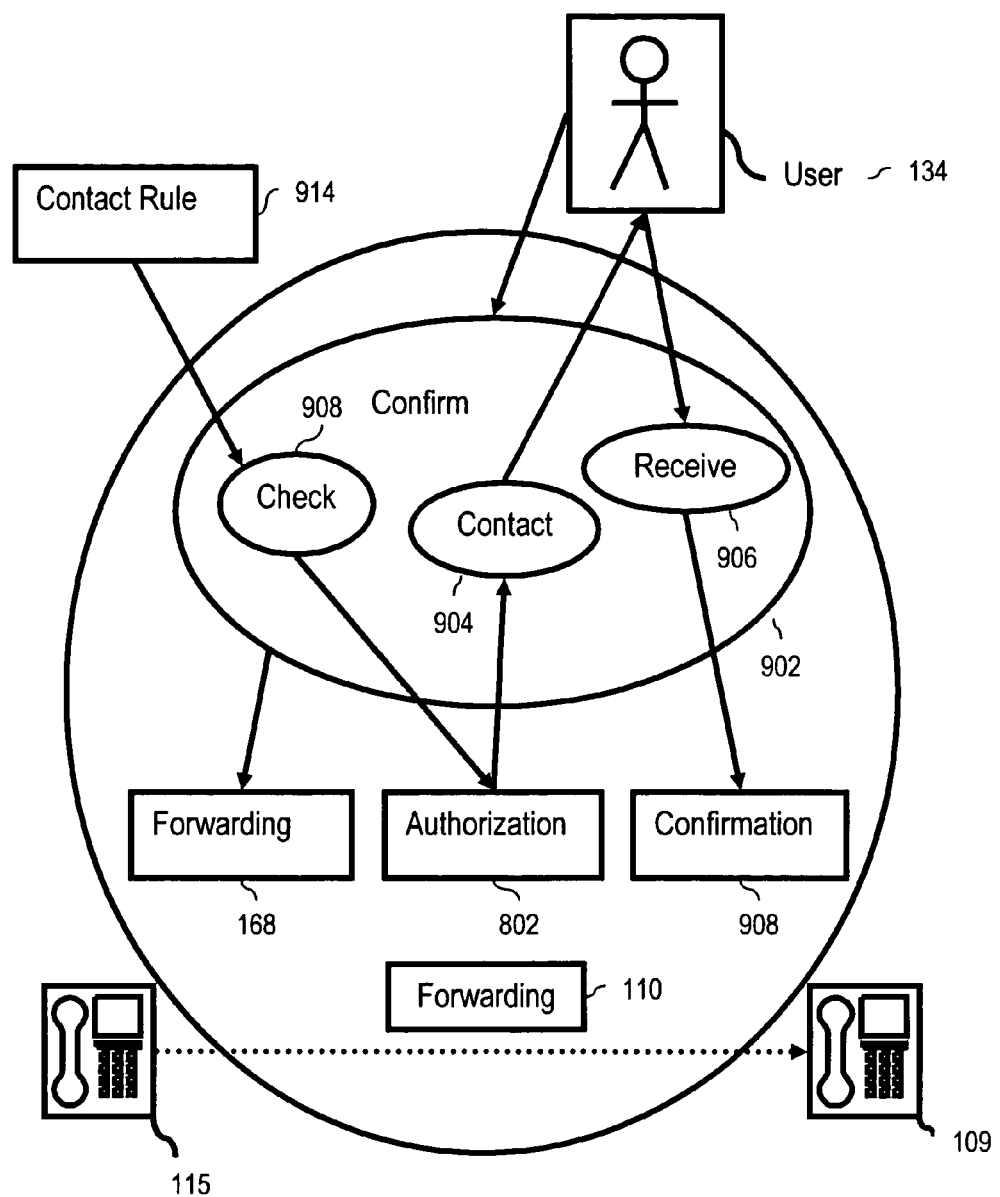
FIG. 7 is a data flow diagram showing a method of forwarding a telephone number.

FIG. 7 is a data flow diagram illustrating a method of forwarding (110) a telephone number (115). In the method of FIG. 7, forwarding (110) a telephone number (115) includes confirming (168) the user's (134) forwarding instructions (168). In some embodiments a user's forwarding instructions are confirmed prior to forwarding (110) the telephone number (115). In the method of FIG. 7, confirming (902) a user specified call forwarding number (109) includes contacting (904) a user (134) and receiving (906) confirmation (908) from the user (134). Contacting (904) a user includes calling the user on the mobile personal communication device. Alternatively, contacting (904) a user includes sending the user a text message on the mobile personal communication device. Sending a text message includes sending a text message using SMTP. Contacting (904) a user includes calling the user on a telephone number through a PSTN number, sending the user an email, or any other method of contacting a user that will occur to those skilled in the art.

In the method of FIG. 7, receiving (906) confirmation (908) from the user includes receiving speech confirming the call forwarding instructions. Receiving speech includes receiving speech and converting the speech to a text command and reading the text command confirming the user's call forwarding instructions. Alternatively, receiving (906) confirmation (908) for the user (134) includes receiving an entry on a keypad, reading a DTMF signal, playing an earcon to the user and receiving no response from the user, or any other method of receiving a confirmation that will occur to those skilled in the art.

In the method of FIG. 7, confirming (902) the user's (134) forwarding instructions (168) includes checking (908) user specified contact rules (914). Checking (908) user specified contact rules (914) include reading contact rules from a contact rule record and determining whether to contact the user in dependence upon the contact rules. For example, if the contact rule indicates that the user is not to be contacted because of the time of day, forwarding (110) a telephone number includes forwarding the telephone number without confirming the forwarding instructions with the user (134). If a contact rule (914) indicates that the user is not to be contacted while en route, forwarding (110) the telephone number includes waiting until the user is at a stationary location before confirming the call forwarding instruction. In some embodiments according to the method of FIG. 7, a call-forwarding application running on a SLEE server confirms (902) the call forwarding instructions (168).

Implementation of New Locales

Figure 8:
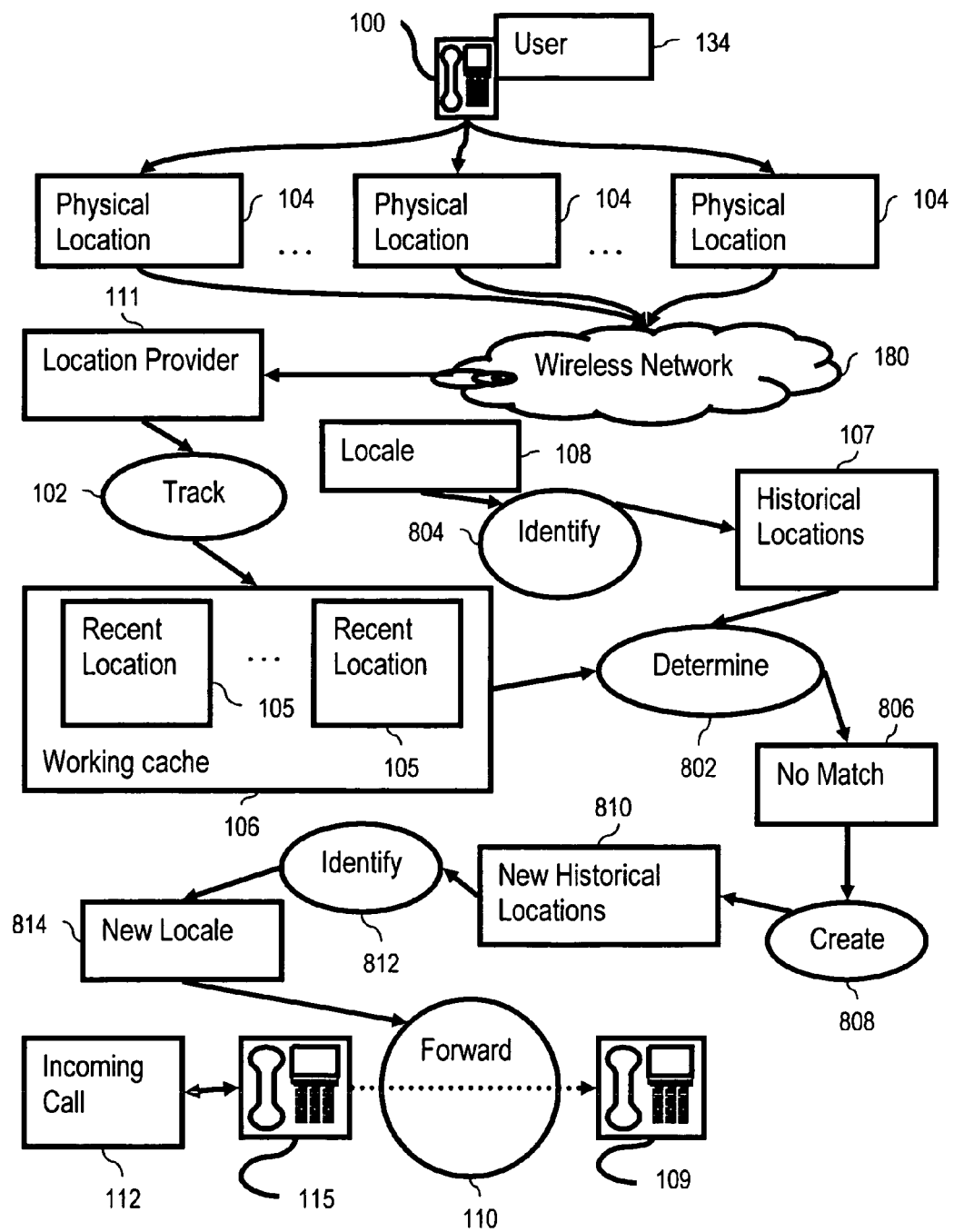
FIG. 8 is a data flow diagram showing a method of forwarding a telephone number.

FIG. 8 is a data flow diagram illustrating an exemplary method of call forwarding according to an exemplary embodiment of the present invention. The method of FIG. 8 includes tracking (102) recent locations (105) of a user (134) with the user's mobile personal communications device (100) and a wireless telecommunications network (180). Tracking (102) includes receiving, from a location provider (111), recent location records (105) through a wireless gateway, storing the recent location records (105) in working cache memory, and gathering the recent location records (105) in working cache memory. Tracking (102) may be carried out by call-forwarding application running on a SLEE server and the working cache memory is provided by a persistent storage device.

The method of FIG. 8 also includes determining (802) whether the recent location records (105) match a set of historical location records (107) identifying (804) a locale (108) for the user (134). The degree to which the recent location match the set of historical location records (107) to identify a locale varies according to the precision of the location information in the recent location records and the historical location records, the tolerances of the methods used for determining (802) whether the recent location records (105) match a set of historical location records (107), user specified conditions, or any other factor that will occur to those skilled in the art. Call forwarding application running on the SLEE server determines (802) whether the recent locations (105) match a set of historical location record (107).

The method of FIG. 8 includes creating (808), if the recent locations (105) do not match (806) a set of historical location records (107), a new set of historical location records (810) identifying (812) a new locale (814) for the user (134) in dependence upon the recent locations (105). In the method of FIG. 8, creating (808) a new set of historical location records (810) includes creating new historical location records and a new locale record in a relational database. A call-forwarding application running on a SLEE server creates a new set of historical location records (810) and a new locale record in a persistent storage device.

The method of FIG. 8 also includes forwarding (110) a telephone number (115) in dependence upon the new locale (814). Forwarding (110) a telephone number (115) includes reading a new forwarding instruction record related to a new locale record (814) and provisioning the forwarding instructions on an SCP through a gateway. A call-forwarding application operating as a root SBB component on a SLEE server provisions call forwarding instructions on an SCP through a gateway to forward the telephone number.

Figure 9:
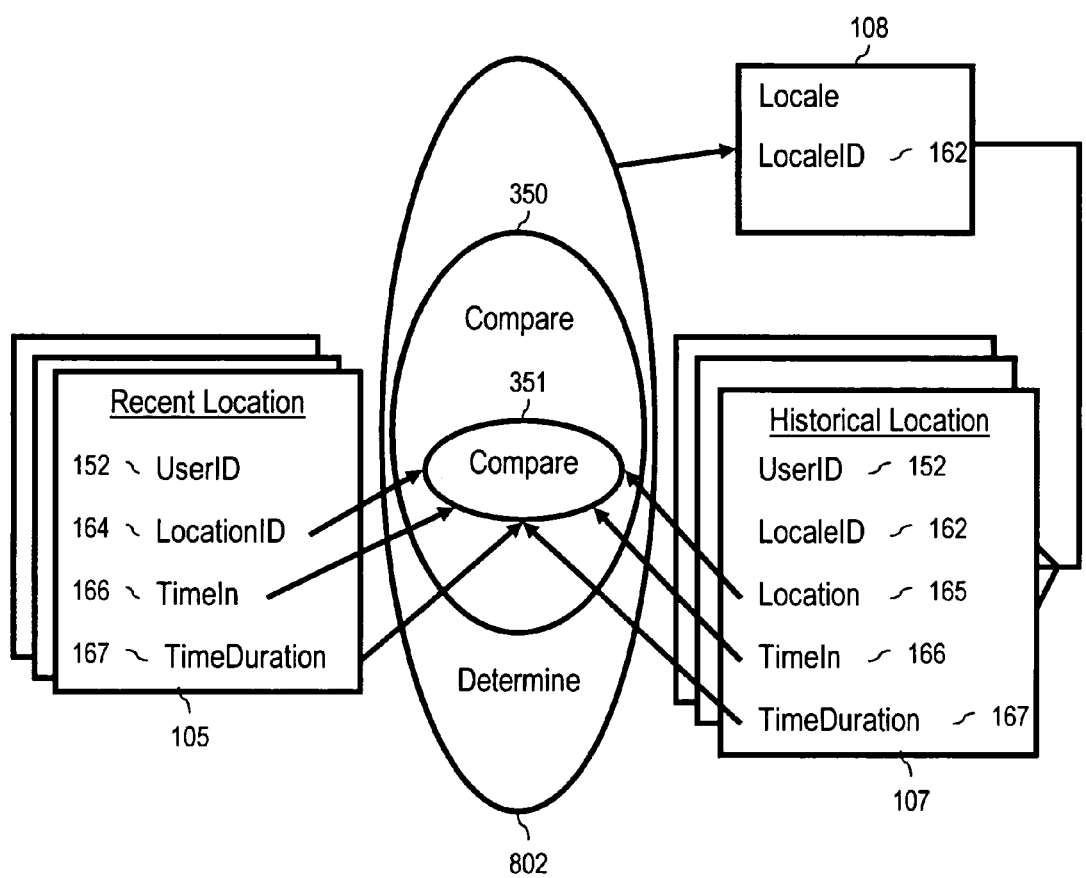
FIG. 9 is a data flow diagram showing a method of determining whether recent locations match a set of historical location records.

FIG. 9 is a dataflow diagram illustrating a method of determining (802) whether the recent locations (105) match a set of historical location records identifying a locale. In the method of FIG. 9 determining (802) whether the recent locations (105) match a set of historical location records identifying a locale (108) for the user further includes comparing (350) a plurality of recent location records (105) and a set a historical location records (107). Comparing (350) a plurality of recent locations (105) and a set of historical location records (107) include reading a plurality of historical location records (107) from a persistent storage device and comparing the plurality of recent location records (105) in working cache with the plurality of historical location records (107).

In the method of FIG. 9, comparing (350) a plurality of recent location records (105) and a plurality of historical location records includes comparing (351) the locationID field (164), the TimeIn field (166), and the TimeDuration field (167) of the recent location records (105) to the location field (165), the TimeIn field (166), and the TimeDuration field (167) of the historical location record (105). The locationID field (164) and the location field (165) contain locations of the mobile personal communication device provided by a location provider. The TimeIn field (166) contains a time stamp corresponding to the time the mobile personal communication device entered a physical location. The TimeDuration filed (167) contains the length of time the mobile personal communication device is located in a physical location. A locale for the user is identified if the locationID field (164), the TimeIn field (166), and the TimeDuration field (167) of the recent location records (105) match the location field (165), the TimeIn field (166) and the TimeDuration field (167) of the historical location records. The degree to which the locationID field (164), the TimeIn field (166), and the Time Duration field (167) of the recent location records (105) must match the Location field (165), the timeIn filed (166) and the TimeDurtion filed (167) of historical location records (107) to identify a locale varies according to the precision of the location information in the locationID field (164) and the location field (165), the tolerances of the methods used for comparing the fields, user specified conditions, and other factors as will occur to those of skill in the art.

A call-forwarding application operating as a root SBB component on a SLEE server maintains the recent locations (105) in working cache memory and reads historical location records (107) stored in a persistent storage device. The call forwarding application carries out the comparing (351) of the locationID fields (164), TimeIn fields (166), and TimeDuration fields (167) of the recent location records (105) with the location fields (165), TimeIn fields (166) and the TimeDuration fields (167) of the historical location records (107) to determine whether a set of historical location records (107) identifying a locale match the recent locations records (105).

Figure 10:
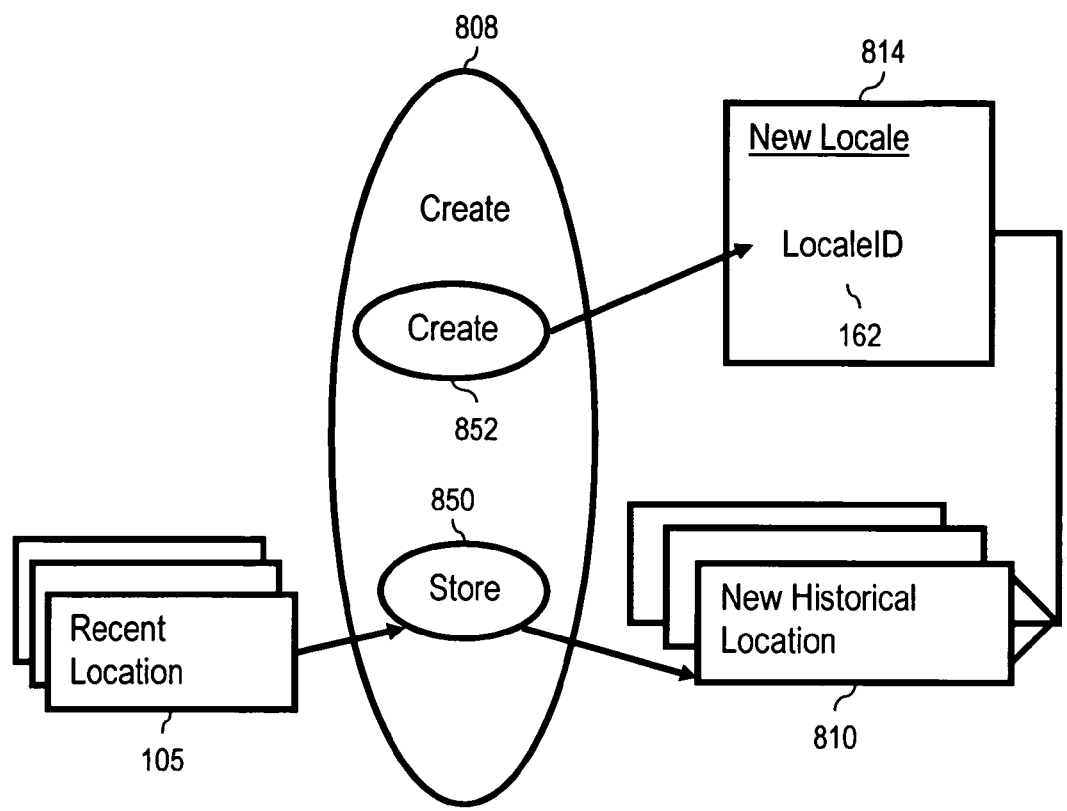
FIG. 10 is a data flow diagram showing a method of creating a new locale record.

FIG. 10 is a dataflow diagram illustrating a method of creating (808) a new locale record and a set of new historical location records (810) for the user's new locale. If the recent locations records (105) in the working cache do not do not match a set of historical location records (107) identifying a locale, then a call forwarding application according to embodiments of the present invention advantageously treats a user as being in a new locale. The method of FIG. 10 includes creating a new locale record (814) for a user's new locale. The method of FIG. 10 also includes storing (850) the plurality of recent location records (105) in the working cache as a set of new historical location records (810).

The new historical location records (810) are related many-to-one to the new locale record (814) through a localeID (162) used as foreign key. The localeID (162) is the same localeID (162) as in the locale records (108) of FIG. 2. In fact, although the new locale record is referred to in this discussion as 'new,' its structure is the same as locale records generally as described above in connection with the data structures of FIG. 2.

Figure 11:
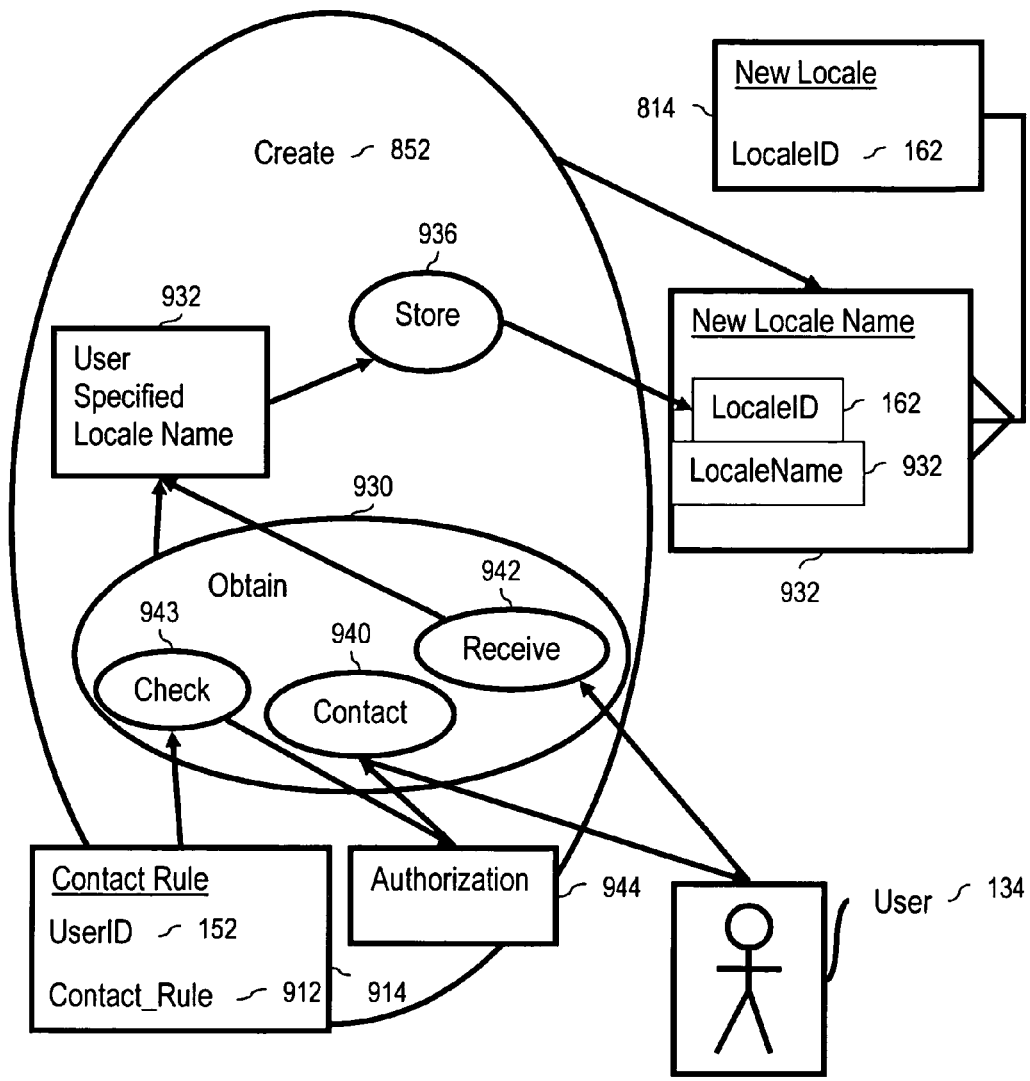
FIG. 11 is a data flow diagram showing a method of creating a new locale name record.

FIG. 11 is a dataflow diagram illustrating a method of creating (852) a new locale name record (932) representing the user's new locale. The new locale name record (932) is related many-to-one to the new locale record (814) through the localeID field (162). Creating (852) a new locale name record (932) includes obtaining (930) a user-specified new locale name (932) from a user (134) for the new locale and storing (936) the user-specified new locale name (932) in the new locale name record (932).

Obtaining (930) a user-specified new locale name (932) from a user (134) for the new locale includes contacting (940) the user (134) and receiving (942) the user-specified new locale name (932). Contacting (940) the user includes calling the user on a mobile personal communication device, calling the user through a PSTN network, sending the user an SMPT message, sending the user an email, sending the user an earcon, or any other method of contacting (940) the user (134). Receiving (942) a user specified locale name includes receiving a speech from the user, receiving an entry on a keypad from the user, or any other method of receiving a user specified locale name (932) that will occur to those skilled in the art.

In the method of FIG. 11, obtaining (930) a user specified locale name (932) includes checking (943) a contact rule record (914) before contacting (940) the user (134). The contact rule records (914) represent rules establishing when a user may be contacted. The contact rule records (914) indicate times or conditions when a user may be contacted or times and conditions when a user may not be contacted. For example, a contact rule may be a block-out time. A user may specify that the user is not to be contacted between 11:00 pm and 6:30 am, because the user is sleeping. Or the user is not to be contacted on Sunday, between 8:00 am and 1:00 pm, because the user is typically at church. The contact rule may be that the user is not to be contacted en route. That is, if the recent locations provided by the location provider indicate that the user is moving from recent location to recent location, the user is not to be contacted for safety, because the user may be driving a car.

Checking (943) a contact rule record (914) includes reading a contact rule (912) from a contact rule record (914) stored in a persistent storage device and contacting (940) the user in dependence of an authorization (944) to contact the user (134). An authorization (944) to contact the user (134) is defined to mean the lack of any current prohibition from contacting the user in the contact rules (912).

In some embodiments of the method of FIG. 11, obtaining (930) a new locale name record is carried out by a call-forwarding application operating as a root SBB component on a SLEE server. The call forwarding application contacts the user using a voice server and receives (942) the new locale name numbers as a voice signals to be converted to text, or other forms of data, such as DTMF signals from a keypad on a user's mobile personal communication device using a DTMF system.

Figure 12:
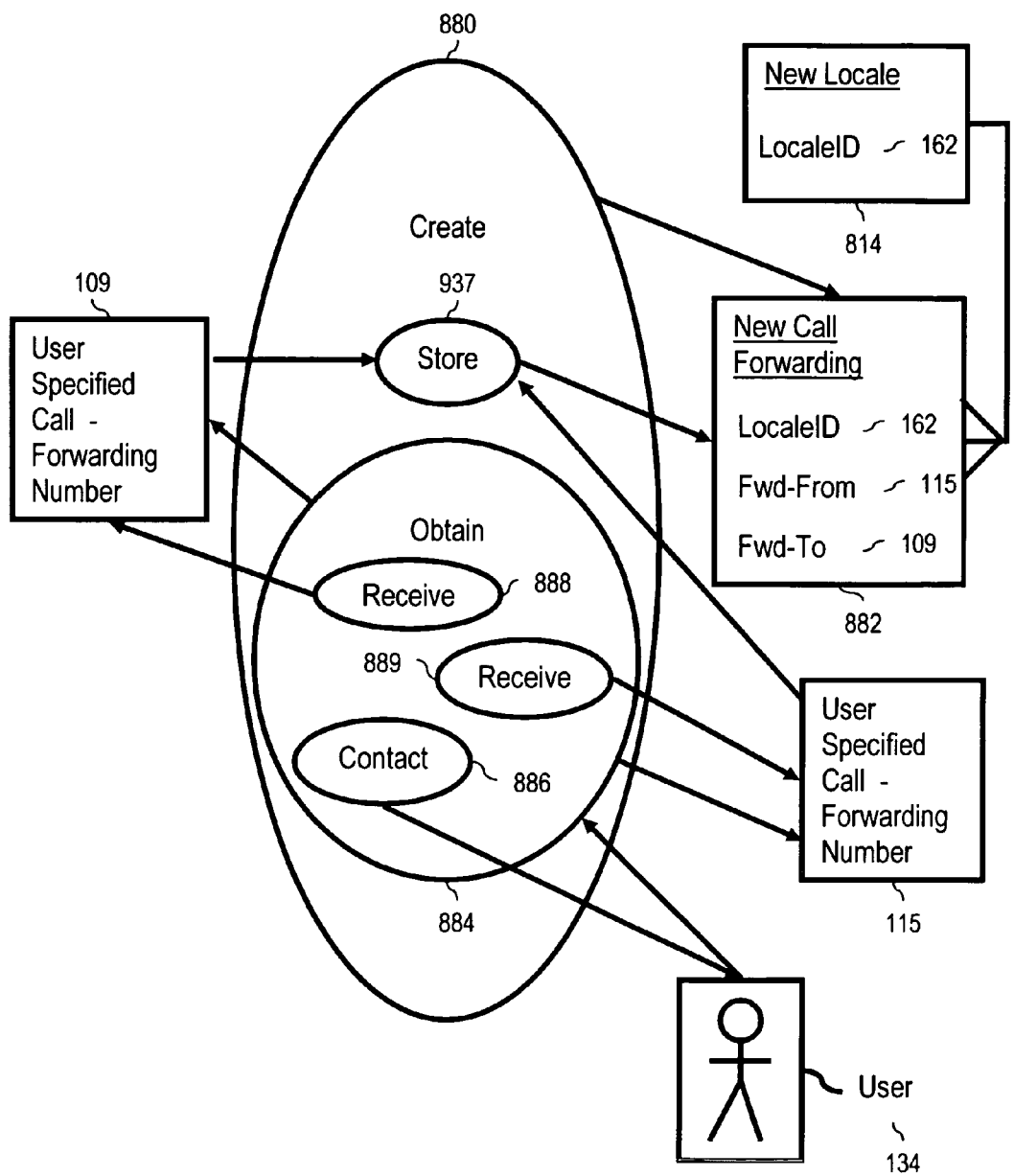
FIG. 12 is a data flow diagram showing a method creating a new call forwarding record.

FIG. 12 is a data flow diagram illustrating a method of creating a call-forwarding instruction record for the new locale. Creating a new call-forwarding instruction record (882) includes creating a new call forwarding instruction record (882) having a call Fwd-from field, a call Fwd-to field, and a new localeID field (820). The call forwarding instruction record (882) is related to a new locale record (814) in a many-to-one relationship through a new localeID field used as a foreign key.

The method of FIG. 12 includes obtaining (884), from a user (134), a telephone number (109) to receive forwarded calls and a telephone number (115) to be forwarded (115) in dependence upon the user being in the new the locale (814). The method of FIG. 12 includes storing (937) the user-specified call forwarding telephone number (109) to receive forwarded calls in the call Fwd-to field (109) and the user specified telephone number (115) to be forwarded in the Fwd-from field (115) of the new call forwarding record (882).

Obtaining (884) a user specified call forwarding number (109) includes contacting (886) the user (134) and receiving (888), from the user (134) a telephone number (109) to receive forwarded calls for the new locale. Obtaining (884) a user specified call forwarding number (115) also includes contacting (886) the user (134) and receiving (889), from the user (134), a telephone number (115) to be forwarded for the new locale. Contacting (886) the user includes calling the user on a mobile personal communication device, calling the user on a telephone through a PSTN network, sending the user an email, sending the user a SMTP message, sending the user an earcon, or any other method of contacting the user. Receiving (888) a user specified call-forwarding number (109) to receive forwarded calls includes receiving speech, receiving a keypad entry or any other method of receiving a call forwarding number (109) that will occur to those skilled in the art. Receiving (889) a user specified call-forwarding number (115) to be forwarded includes receiving speech, receiving a keypad entry or any other method of receiving a call forwarding number (115) that will occur to those skilled in the art.

In some embodiments of the method of FIG. 12, obtaining (884) a user specified call forwarding number (109) is carried out by a call-forwarding application operating as a root SBB component on a SLEE server. The call forwarding application contacts the user using a voice server and receives (942) user specified call forwarding numbers as a voice signals to be converted to text, or other forms of data, such as DTMF signals from a keypad on a user's mobile personal communication device using a DTMF system.

Figure 13:
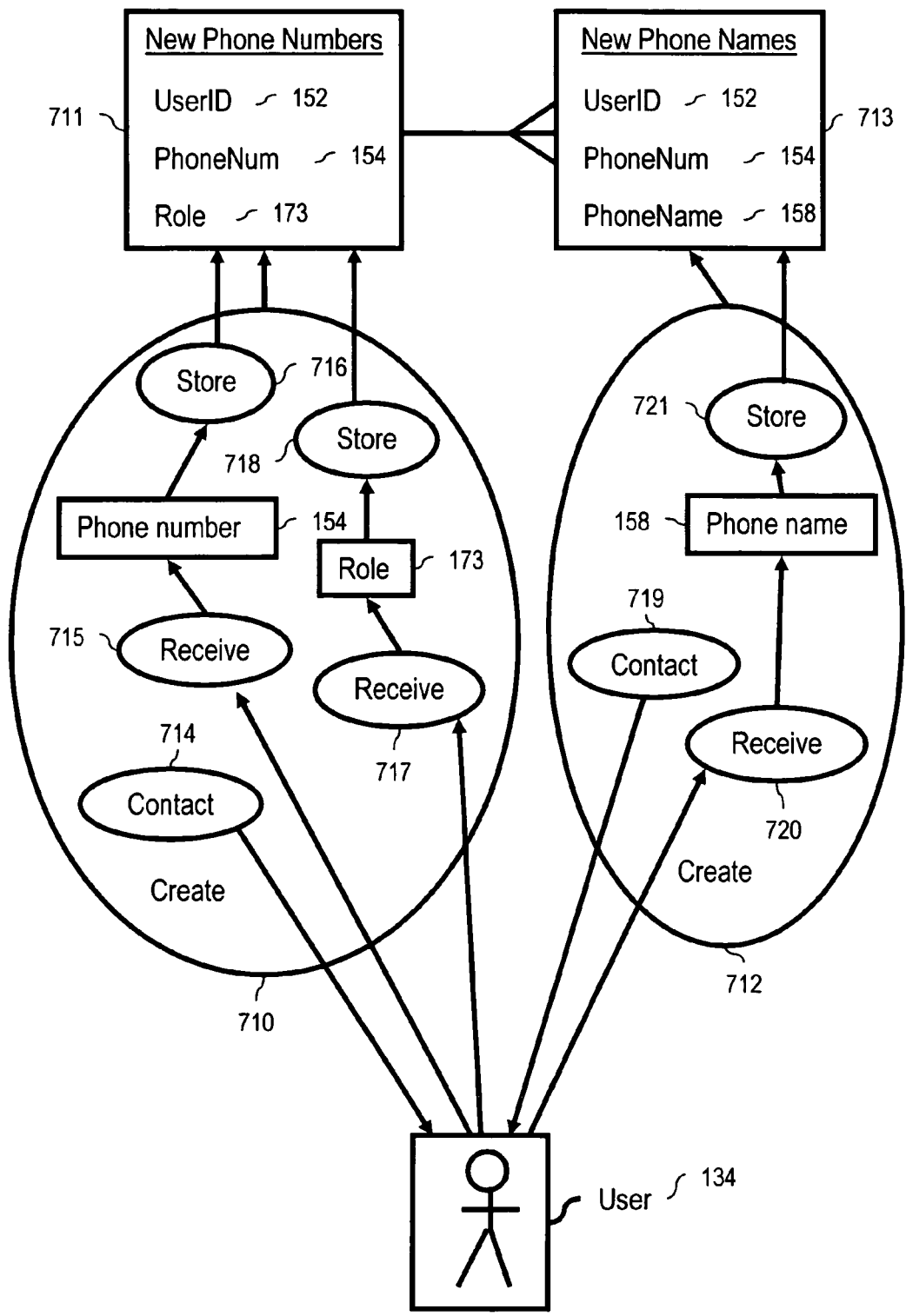
FIG. 13 is a data flow diagram showing a method of creating a new phone number record and a method of creating a new phone name record.

FIG. 13 illustrates a method of creating (710) a new phone number record (711) and a method of creating (712) a new phone name record (713). In the method of FIG. 13, creating (712) a new phone number record (711) includes contacting (714) the user (134) and receiving (715) a telephone number (154) from the user (154). Contacting (714) the user (134) includes calling the user on a mobile personal communication device, calling the user through a PSTN network, sending the user an SMPT message, sending the user an email, sending the user an earcon, or any other method of contacting (714) the user (134). Receiving (715) a phone number (716) includes receiving speech from the user, receiving and entry on a keypad from the user, or any other method of receiving (715) a phone number (154) that will occur to those skilled in the art. The method of FIG. 13 includes storing (716) the telephone number in the new phone number record (711).

Creating (712) a new phone number record (711) also includes receiving (717) a role (173) for the phone number (154) and storing (718) the role (173) in the phone number record (711). The phone number records (153) include a role field (173). A role is a description of the user's relationship with a telephone number. The role of the telephone number stored in the telephone number field (154) is stored in the role field (173). One example of a role is referred to as a "trigger." In typical embodiments of the present invention, a "trigger" is the role of the telephone number of a mobile personal communication device from which recent locations for a user are derived. Only one phone number may be identified as having the role of "trigger."

Another example of a role is "owned," for a telephone number that the user is authorized to forward. "Destination" is a role indicating that the telephone number stored in the telephone number field (154) is a telephone number the user does not have authority to forward, but is a telephone number to which the user forwards calls.

The method of claim 13 illustrates creating (712) a new phone name record (713). The new phone name record (713) represents a user specified name for the related new phone number record (711). By assigning a particular phone number a user-specified name, the user may identify the phone number by name in establishing a call forwarding instruction for a locale. By naming phone numbers, the user avoids having to look up or memorize telephone numbers that the user commonly forwards telephone numbers to or from when establishing a call forwarding instruction for a locale. The new phone name record (713) is related to the phone number (711) record in a many-to-one relationship through a phone number field and userID field used as a composite foreign key.

In the method of FIG. 13, creating (712) a new phone name record (713) includes contacting (719) a user (134). The method includes receiving (720 a phone name (158) and storing the phone name (158) in the new phone name record.

Contacting (719) the user (134) includes calling the user on a mobile personal communication device, calling the user through a PSTN network, sending the user an SMPT message, sending the user an email, sending the user an earcon, or any other method of contacting (719) the user (134). Receiving (720) a phone name (158) includes receiving speech from the user, receiving and entry on a keypad from the user, or any other method of receiving (720) a phone name (158) that will occur to those skilled in the art.

In some embodiments according to FIG. 13, creating a new phone number record and creating a new phone name record is carried out by a call-forwarding application operating as a root SBB component on a SLEE server. The call-forwarding application contacts (886) the user using a voice server and receives (889) user specified call forwarding numbers as a voice signals to be converted to text, or other forms of data, such as DTMF signals from a keypad on a user's mobile personal communication device using a DTMF system.

Figure 14:
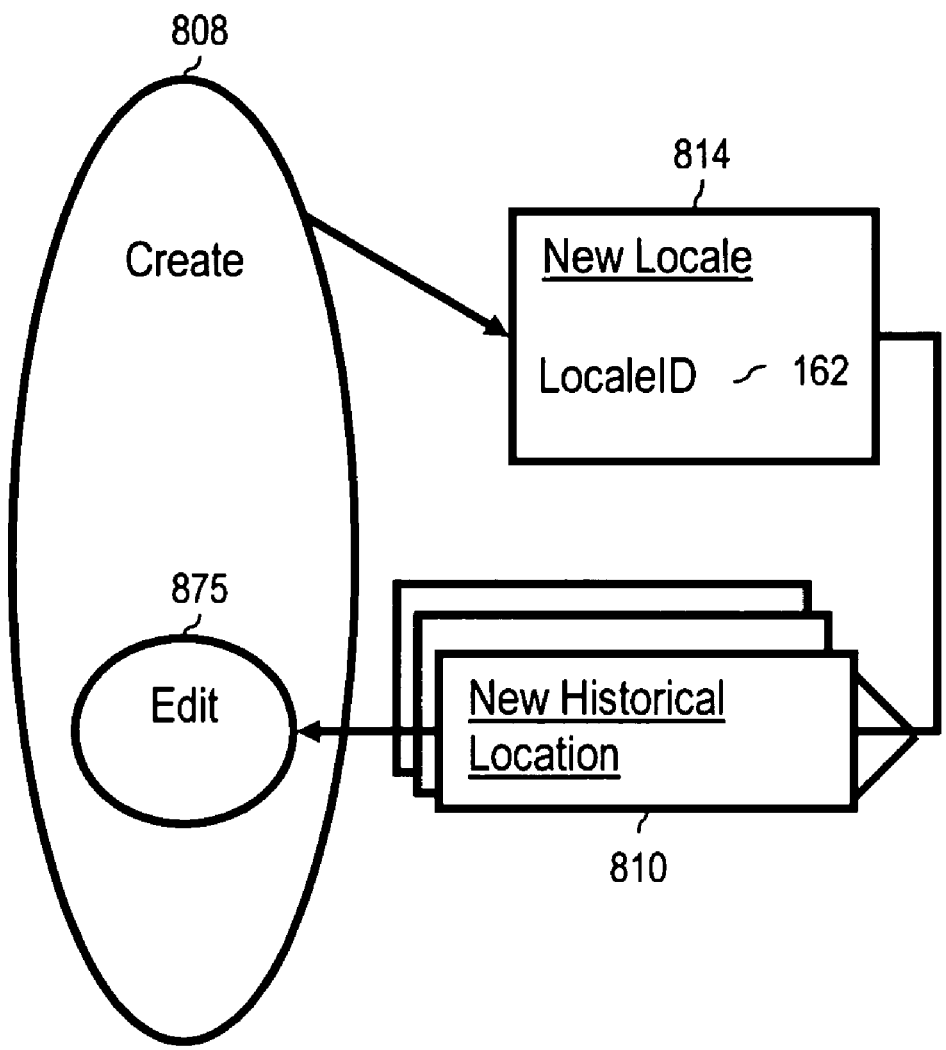
FIG. 14 is a data flow diagram showing a method of editing new historical location records.

FIG. 14 is a data flow diagram illustrating a method of creating (808) a new locale record (814). Creating (808) a new locale record (814) includes editing (875) the new set of historical records (810). Editing (875) the new set of historical records (810) includes manipulating, deleting, adding, or otherwise changing the contents of the new historical records (810). By editing the new set of historical location records (810), a user may define the new locale (814) with fewer historical location records (810).

For example, a new route to work may be determined to be a new locale (814). The user may however, wish this new locale to encompass a few minor deviations. On Mondays, a user may leave his house traveling in one direction and on Tuesdays, the user may leave the house in the opposite direction. The user edits (875) new historical location records (810) which are not important to identifying the new locale (814) by deleting the unimportant new historical location records (810). By editing (875) the new historical location records, the user reduces the number of new historical location records that identify the new locale.

Editing (875) includes accessing and editing a set of new historical location records (810) stored in a persistent storage device through a web browser, internet, and web server. Editing (875) also includes accessing the new historical location records through a mobile personal communication device or a telephone and editing the new historical location records using a keypad, speech, or any other method of editing that will occur to those skilled in the art.

An Exemplary Use Case and Sample Dialog

Returning to FIG. 1, as an aid to further understanding, an exemplary use case and sample dialog is provided. A user keeps his mobile personal communication device (100) with the user most of the time. The mobile personal communication device's (100) physical location, or rather a sequence of physical locations, is used to identify a locale of the user. A relational database of the user's locale records, historical location records, phone number records, phone name records, call forwarding records, locale name records and contact rule records are stored in a persistent storage device (194).

The user travels to work. A call-forwarding application (121) running on a SLEE server (198) tracks a plurality of recent locations of the user as recent location records provided by a location provider through a wireless network (180). The call-forwarding application (121) compares the recent locations of the user in working cache memory with a plurality of historical location records stored in the persistent storage device (914). The call-forwarding application (121) identifies a set of historical location records stored in the persistent storage device (194) that match the recent locations. The set of historical location records are related to a locale record having a locale name "work." The call-forwarding application (121) identifies call forwarding instruction records related to the locale record for "work" stored in the persistent storage device. The call forwarding instruction records dictate that the user's home and mobile phone are to be forwarded to the users work phone for the locale "work." The call-forwarding application (121) contacts the user using a voice server to confirm the locale named "work" with the user.

The call-forwarding application (121) using a voice server (196): "It appears that you have arrived at work. Would you like to have your home and mobile calls routed to you at this location?

The User Answers: "Yes."

The call-forwarding application (121) running on the SLEE server (198) provisions call forwarding instructions forwarding the user's home telephone number to the user work telephone number on an SCP (126) through a wireline Gateway (186). The call-forwarding application (121) provisions call forwarding instructions forwarding the telephone number of the mobile personal communication device (100) to the user's work telephone number on a SCP (127) through a wireless Gateway (188).

The user leaves work and travels to a friend's house. The call-forwarding application (121) tracks a plurality of recent locations of the user by tracking a plurality of recent location records provided by a location provider through a wireless network (126) and identifies that the plurality of recent location records do not match a set of historical location records identifying a locale. The call-forwarding application (121) checks a plurality of contact rules and determines that the user is not to be contacted until reaching a stationary location. The call-forwarding application (121) stores the recent location records as new historical location records, creates a new locale record, and creates a new locale name record with a default locale name in persistent storage (194). When the user arrives at the friend's house, the call-forwarding application (121) contacts the user using a voice server (196).

The call-forwarding application (121) using a voice server (196) asks: "It appears that you have arrived at a new locale. Would you like to have your mobile calls routed to the new locale?"

The User answers: "Yes."

The call-forwarding application (121) using a voice server (196) asks: "What would you like to name the new locale."

The User answers: "Larry's house."

The call-forwarding application (121) receives the name "Larry's house" using a voice server and stores "Larry's house" in the new locale name record in persistent storage (194).

The Call-forwarding application (121) using a voice server asks: "Please enter a telephone number to receive forwarded calls for 'Larry's house.'"

The User speaks or enters on the keypad of the mobile personal communication device (100): "512-555-1770"

The application software (121) receives "512-55-1770" and using a voice server (196) confirms: "512-555-1770 will receive forwarded calls for the locale 'Larry's house' is 512-555-1770, is this correct?"

The User answers: "Yes."

The call-forwarding application (121) creates a new forwarding instruction record related to the new locale record. The call-forwarding application (121) receives 512-555-1770 from the voice server (196) and stores 512-555-1770 in a forward-to field of the new call forwarding instruction record in the persistent storage device (194).

The call-forwarding application (121) using a voice server (196) asks: "Please enter a number to be forwarded for 'Larry's house.'"

The User speaks or enters on the keypad of the mobile personal communication device: "512-555-0000"

The call-forwarding application (121) using a voice server (196) confirms: "512-555-0000 is to be forwarded for 'Larry's house,' is this correct?"

The User answers: "Yes."

The call forwarding application (121) receives 512-555-000 using the voice server and saves 512-555-0000 in the forward-from field of the forwarding instructions record.

The call-forwarding application (121) using a voice server (196) asks: "Are there other telephone numbers to be forwarded to 512-555-1770 for 'Larry's house'."

The User answers: "Yes"

The call-forwarding application (121) using a voice server (196) asks: "Please enter another number to be forwarded for 'Larry's house.'"

The User answers: "512-555-9425"

The call-forwarding application (121) using a voice server (196) receives '512-555-9425.' The call-forwarding application (121) creates another call forwarding instructions record in the persistent storage device (194) for the locale 'Larry's house.' The call-forwarding application (121) stores 512-555-1770 in the forward-to field of the call forwarding record and stores 512-555-9425 in the call forwarding-from field of the new call fording instruction record stored in the persistent storage device (194).

The call-forwarding application (121) using a voice server (196) confirms: "512-555-0000 and 512-555-9425 will be routed to 512-555-1770 when the locale 'Larry's house."

The call-forwarding application (121) using a voice server (196) asks: "512-555-0000 is a number that has previously not been forwarded, would you like to name 512-555-000?"

The User answers: "New Work phone."

The call-forwarding application (121) creates a new phone number record in the persistent storage device (194) and receives 512-555-0000 using the voice server and stores 512-555-0000 in the new phone number record. The call-forwarding application (121) creates a new phone name record, and stores "new work phone" in the phone name record. The phone name record is related to the phone number record through a foreign key.

The call-forwarding application (121) using a voice server (196) asks: "Would you like to forward another phone number to "Larry's house."

The User answers: "No."

The call-forwarding application (121) using a voice server (196) responds: "Goodbye."

By interacting in manners similar to the dialog just described the user builds a set of locale records for the user in persistent storage. Locales are identified in dependence upon the recent locations of the user and call forwarding instructions are provisioned onto a SCP (126) of a PSTN network (182) through a wireline gateway (186) or an SCP (127) of a wireless network (180) through a wireless gateway (188) in dependence upon the locales.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of forwarding a telephone number, the method comprising:
   tracking recent locations of a user with the user's mobile personal communications device and a wireless telecommunications network;
   determining whether the recent locations match a set of historical location records identifying a locale for the user;
   creating, if the recent locations do not match a set of historical location records, a new set of historical location records identifying a new locale for the user in dependence upon the recent locations; and
   forwarding a telephone number in dependence upon the new locale.

2. The method of claim 1, wherein determining whether the recent locations match a set of historical location records identifying a locale for the user further comprises comparing a plurality of recent locations and a set a historical location records.

3. The method of claim 1, wherein creating, if the recent locations do not match a set of historical location records, a new set of historical location records identifying a new locale for the user in dependence upon the recent locations further comprises storing the plurality of recent locations as a new set of historical location records.

4. The method of claim 1, wherein creating, if the recent locations do not match a set of historical location records, a new set of historical location records identifying a new locale for the user in dependence upon the recent locations further comprises storing the plurality of recent locations as a new set of historical location records and creating a new locale record; wherein the new set of historical location records are related to the new locale record through a foreign key.

5. The method of claim 4, wherein creating a new locale record further comprises obtaining a user-specified new locale name from a user for the new locale and storing the user-specified new locale name in a new locale name record, wherein the new locale record is related to the new locale record through a foreign key.

6. The method of claim 5, wherein obtaining a user-specified new locale name from a user for the new locale comprises contacting the user and receiving the user-specified new locale name.

7. The method of claim 1, further comprising creating a new call-forwarding record for the new locale.

8. The method of claim 7, wherein creating a new call-forwarding record for the new locale comprises obtaining a user-specified call forwarding number from a user for the locale and storing the user-specified call forwarding number in a call-forwarding record.

9. The method of claim 1, further comprising creating a new a phone number record for the new locale and creating a new a phone name record wherein the new phone name record is related to the new phone number record through a foreign key.

10. The method of claim 1, wherein creating, if the recent locations do not match a set of historical location records, a new set of historical location records identifying a new locale for the user in dependence upon the recent locations further comprises editing the new set of historical records.

11. A system for forwarding a telephone number, the system comprising:
    means for tracking recent locations of a user with the user's mobile personal communications device and a wireless telecommunications network;
    means for determining whether the recent locations match a set of historical location records identifying a locale for the user;
    means for creating, if the recent locations do not match a set of historical location records, a new set of historical location records identifying a new locale for the user in dependence upon the recent locations; and
    means for forwarding a telephone number in dependence upon the new locale.

12. The system of claim 11, wherein means for determining whether the recent locations match a set of historical location records identifying a locale for the user further comprises means for comparing a plurality of recent locations and a set a historical location records.

13. The system of claim 11, wherein means for creating, if the recent locations do not match a set of historical location records, a new set of historical location records identifying a new locale for the user in dependence upon the recent locations further comprises means for storing the plurality of recent locations as a new set of historical location records.

14. The system of claim 11, wherein means for creating, if the recent locations do not match a set of historical location records, a new set of historical location records identifying a new locale for the user in dependence upon the recent locations further comprises means for storing the plurality of recent locations as a new set of historical location records and means for creating a new locale record; wherein the new set of historical location records are related to the new locale record through a foreign key.

15. The system of claim 14, wherein means for creating a new locale record further comprises means for obtaining a user-specified new locale name from a user for the new locale and means for storing the user-specified new locale name in a new locale name record, wherein the new locale record is related to the new locale record through a foreign key.

16. The system of claim 15, wherein means for obtaining a user-specified new locale name from a user for the new locale comprises means for contacting the user and means for receiving the user-specified new locale name.

17. The system of claim 11, further comprising means for creating a new call-forwarding record for the new locale.

18. The system of claim 17, wherein means for creating a new call-forwarding record for the new locale comprises means for obtaining a user-specified call forwarding number from a user for the locale and means for storing the user-specified call forwarding number in a call-forwarding record.

19. The system of claim 11, further comprising means for creating a new a phone number record for the new locale and means for creating a new a phone name record wherein the new phone name record is related to the new phone number record through a foreign key.

20. The system of claim 11, wherein means for creating, if the recent locations do not match a set of historical location records, a new set of historical location records identifying a new locale for the user in dependence upon the recent locations further comprises means for editing the new set of historical records.

21. A computer program product for forwarding a telephone number, the program product comprising:
- a recording medium;
- means, recorded on the recording medium, for tracking recent locations of a user with the user's mobile personal communications device and a wireless telecommunications network;
- means, recorded on the recording medium, for determining whether the recent locations match a set of historical location records identifying a locale for the user;
- means, recorded on the recording medium, for creating, if the recent locations do not match a set of historical location records, a new set of historical location records identifying a new locale for the user in dependence upon the recent locations; and
- means, recorded on the recording medium, for forwarding a telephone number in dependence upon the new locale.

22. The computer program product of claim 21, wherein means, recorded on the recording medium, for determining whether the recent locations match a set of historical location records identifying a locale for the user further comprises means, recorded on the recording medium, for comparing a plurality of recent locations and a set a historical location records.

23. The computer program product of claim 21, wherein means for creating, if the recent locations do not match a set of historical location records, a new set of historical location records identifying a new locale for the user in dependence upon the recent locations further comprises means, recorded on the recording medium, for storing the plurality of recent locations as a new set of historical location records.

24. The computer program product of claim 21, wherein means for creating, if the recent locations do not match a set of historical location records, a new set of historical location records identifying a new locale for the user in dependence upon the recent locations further comprises means, recorded on the recording medium, for storing the plurality of recent locations as a new set of historical location records and means, recorded on the recording medium, for creating a new locale record; wherein the new set of historical location records are related to the new locale record through a foreign key.

25. The computer program product of claim 24, wherein means for creating a new locale record further comprises means, recorded on the recording medium, for obtaining a user-specified new locale name from a user for the new locale and means, recorded on the recording medium, for storing the user-specified new locale name in a new locale name record, wherein the new locale record is related to the new locale record through a foreign key.

26. The computer program product of claim 25, wherein means for obtaining a user-specified new locale name from a user for the new locale comprises means, recorded on the recording medium, for contacting the user and means for receiving the user-specified new locale name.

27. The computer program product of claim 21, further comprising means, recorded on the recording medium, for creating a new call-forwarding record for the new locale.

28. The computer program product of claim 27, wherein means for creating a new call-forwarding record for the new locale comprises means, recorded on the recording medium, for obtaining a user-specified call forwarding number from a user for the locale and means, recorded on the recording medium, for storing the user-specified call forwarding number in a call-forwarding record.

29. The computer program product of claim 21, further comprising means, recorded on the recording medium, for creating a new a phone number record for the new locale and means, recorded on the recording medium, for creating a new a phone name record wherein the new phone name record is related to the new phone number record through a foreign key.

30. The computer program product of claim 21, wherein means for creating, if the recent locations do not match a set of historical location records, a new set of historical location records identifying a new locale for the user in dependence upon the recent locations further comprises means, recorded on the recording medium, for editing the new set of historical records.

* * * * *